(12) United States Patent
Cakmak et al.

(10) Patent No.: US 11,831,097 B2
(45) Date of Patent: Nov. 28, 2023

(54) UV-CURABLE CONTACT STABILIZATION COATING MATERIAL FOR ELECTRICAL CONTACT SURFACES

(71) Applicants: Mukerrem Cakmak, Lafayette, IN (US); Mark D. Soucek, Akron, OH (US)

(72) Inventors: Mukerrem Cakmak, Lafayette, IN (US); Mark D. Soucek, Akron, OH (US)

(73) Assignee: THE UNIVERSITY OF AKRON, Akron, OH (US)

( * ) Notice: Subject to any disclaimer, the term of this patent is extended or adjusted under 35 U.S.C. 154(b) by 1300 days.

(21) Appl. No.: 16/313,975

(22) PCT Filed: Jun. 30, 2017

(86) PCT No.: PCT/US2017/040341
§ 371 (c)(1),
(2) Date: Dec. 28, 2018

(87) PCT Pub. No.: WO2018/005997
PCT Pub. Date: Jan. 4, 2018

(65) Prior Publication Data
US 2019/0199026 A1    Jun. 27, 2019

Related U.S. Application Data

(60) Provisional application No. 62/356,582, filed on Jun. 30, 2016.

(51) Int. Cl.
*H01R 13/03* (2006.01)
*B32B 15/00* (2006.01)
(Continued)

(52) U.S. Cl.
CPC ............ *H01R 13/03* (2013.01); *B32B 15/00* (2013.01); *C08F 2/06* (2013.01); *C09D 4/06* (2013.01);
(Continued)

(58) Field of Classification Search
None
See application file for complete search history.

(56) References Cited

U.S. PATENT DOCUMENTS 4,696,832 A * 9/1987 Wright .................. H01R 13/03
                                                           200/278
5,489,624 A * 2/1996 Kantner .............. H01M 10/052
                                                          524/379
(Continued)

FOREIGN PATENT DOCUMENTS

KR         101315153 B1 * 10/2013 ........... C09D 133/04

OTHER PUBLICATIONS

Cong—aminosilane cross-linked PEG membranes—ISR D2—2010 (Year: 2010).*
(Continued)

*Primary Examiner* — John Vincent Lawler
(74) *Attorney, Agent, or Firm* — RENNER KENNER GREIVE BOBAK TAYLOR & WEBER

(57) ABSTRACT

An electrical contact includes: a first contact surface; a second contact surface; and a coating dispersed on at least one of the first or second contact surfaces, where the coating includes the cured product of a telechelic polypropylene glycol-polyethylene glycol multi-block polymer.

18 Claims, 12 Drawing Sheets

(51) Int. Cl.
    *C09D 4/06*         (2006.01)
    *C09D 171/02*     (2006.01)
    *C08F 2/06*         (2006.01)
    *H01H 1/04*         (2006.01)

(52) U.S. Cl.
    CPC ............ *C09D 171/02* (2013.01); *H01H 1/04* (2013.01); *B32B 2255/06* (2013.01); *B32B 2255/26* (2013.01); *Y10T 428/31678* (2015.04)

(56) References Cited

U.S. PATENT DOCUMENTS

| | | |
|---|---|---|
| 2003/0045027 A1 | 5/2003 | Johnson et al. |
| 2006/0211236 A1 | 12/2006 | Bureau et al. |
| 2007/0120279 A1* | 5/2007 | Linhardt .......... B29D 11/00865 |
| | | 427/163.1 |
| 2013/0109773 A1* | 5/2013 | Hebbrecht .............. C08L 33/08 |
| | | 521/134 |
| 2014/0037911 A1* | 2/2014 | Amano ................ C09D 133/12 |
| | | 428/172 |

OTHER PUBLICATIONS

Kiguchi—KR 101315153 B1—MT—photocuring hydrophilic coating—2013 (Year: 2013).*
Cong H., et al. Aminosilane Cross-linked PEG/PEPEG/PPEPG Membranes for CO2/N2 and CO2/H2 Separation: Industrial & Engineering Chemistry Research [online], Oct. 6, 2010 (Jun. 10, 2010), retreived on Sep. 5, 2017] vol. 49, issue 19, retrieved from the Internet: >DOI:10.1021/ie1012568>, pp. 9363-9369; see entire document, especially p. 9363-9364.

* cited by examiner

UV-CURABLE CONTACT STABILIZATION COATING MATERIAL FOR ELECTRICAL CONTACT SURFACES

CROSS-REFERENCE TO RELATED APPLICATIONS

This application claims priority from U.S. provisional patent application Ser. No. 62/356,582 filed on Jun. 30, 2016, which is incorporated herein by reference in its entirety.

FIELD OF THE INVENTION

One or more embodiments are directed to a coating of a cured polymer and the use of the coating of a cured polymer as a contact stabilization material for an electrical contact. Embodiments also include methods of stabilizing an electrical contact by applying a coating of a polymer and curing the polymer.

BACKGROUND OF THE INVENTION

In all electrical contacts, the co-operating contact surfaces can never be perfectly flat. When observed under high magnification, the contact surfaces appear fairly rough with numerous irregular peaks and pits. The parameters including manufacturing processes and impurities attached to the surfaces contribute to the general surface roughness. In fact, the transmission of electric current from one contact surface to another can only take place at those parts where there is an ideal physical contact between surface materials. Such surface roughness results in detrimental effects to a variety of applications. For example, in high current applications, there may be heat induced deformation or even chemical reaction due to the contact resistance. In micro-power current applications, as low current or power scale video cable connectors, radio frequency or audio frequency connectors etc., the contact resistance may result in an discontinuity in the signal flow when the signals involved are alternating complex waveforms where the voltage potential between the contact surfaces alters from positive to negative potential or vice versa. Also, this discontinuity in alternating signals transmission can add artificial signals to the transmission in radio frequency circuitry or exaggerate the noise level and cause program crashes, incorrect data transmission, spurious parity, and cyclic redundancy error in the case of computer circuitry.

In order to decrease contact surface resistance and enhance signal current flow, some lubricant materials have been already produced to be coated on at least one of the co-operating electrical contact surfaces before plugging together. For instance, graphite has been used as a lubricant for sliding electrical contacts because of its steady contact voltage drop as well as low friction and wear. However, it was found that graphite wears away in low humidity atmosphere due to the lack of water vapor and oxygen. Another active lubricant is molybdenum disulfide ($MoS_2$) which can be used under low humidity. Consequently, it is generally used as a lubricant for vacuum sliding or rolling contact applications. Although $MoS_2$ has ability to reduce the wear rates and noise levels, metallic elements must be added in large amounts to overcome its high electrical resistance. The effectiveness of graphite or $MoS_2$ as lubricant coatings relies on their ability to cling to the metal surfaces and to resist displacement on sliding or rolling. However, the adhesion of these materials to metal surfaces is not satisfactory.

Many polymeric materials such as oils, greases, and synthetic lubricants have been already used for electrical contacts. In fact, by suitable selection of lubricants, the electrical contact surfaces can be improved without adverse effects on the contact resistance. The insulating layers having thicknesses of the order of 1000 A in thin-film circuitry have been developed for several years. Furthermore, the films in thinner layers of the order of 100 A thick exhibited a nonlinear current-voltage property at low voltage, which is suitable for appropriate applications. Hence, the electrical characteristics of these thin dielectric layers have been investigated through sandwiching them between vacuum deposited metal films, utilized as electrodes. The conductivity of the sandwich and the current through the film can be measured under different conditions.

Electron transport through a dielectric material can be divided theoretically into two conditions, depending on whether the voltage applied across the film is large or small. When the voltage is small, the dielectric is a classically forbidden area for electrons at the Fermi level. Therefore, at absolute zero temperature, the electron transport would be via direct tunneling from one metallic electrode to the other one. In the case of large voltages, tunneling would generally occur from the cathode into the conduction band of the dielectric material (electron injection), through which the electrons move on the remainder of their path to the anode. Basically, this distinction implies a division of film thicknesses into two classes, because at a given voltage the current through the film is strongly dependent on the thickness. To get a measurable current at voltages of the order of a volt, the film thickness should be of the order of 100 A, whereas for thicker films of the order of 1000 A the current is difficult to measure in a simple manner unless the applied voltage is more than about 10 V. Consequently, in the thicker films the observed electron transport will depend not only on the mode of electron injection but also on electron scattering in the conduction band of the dielectric, since the mean free path can be expected to be much less than 1000 A. At temperatures above absolute zero, Schottky emission or other thermal effects modify the current, but the same differences with respect to thickness remain. In another study, it was proposed that electron transfer across thicker films could proceed by band conduction or phonon-assisted hopping via localized electronic states. Experimental data for electron transfer across thin films of polyacrylonitrile on platinum or stainless steel substrates in both solid-state junctions and electrochemical systems involving redox reactions were already presented. Comparison with the predicted relationships between overvoltage, current density, and film properties showed that the electron transfer mechanism in these systems was likely to be inelastic tunneling and/or phonon-assisted hopping.

A commercially available and efficient contact stabilization coating material, Stabilant 22, which is described in U.S. Pat. No. 4,696,832. It was reported that by using this material the discontinuity between the co-operating electrical contact surfaces was basically eliminated, and the zero-crossing distortion, which is caused through the interruption of electrons flow at zero volts in a sinusoidal signal transmission across the connection, was substantially erased. In addition, the signal strength loss in the transmission of radio frequency was eliminated after application of this material. Improvements in signal transmission in both video and audio applications were also observed after being treated by Stabilant 22, evidenced by the improvements in picture sharpness, color accuracy and the clarity of sound. Moreover, it was noted that using this material on all edge card connectors and microchip sockets resulted in a significant decrease in rise time, which improved the reliability and performance of socketed integrated circuits. Despite the fact that Stabilant 22 is able to improve the performance of electrical contact co-operating surfaces, this material is fluid at room temperature. This fluidity, due to its flowing or leakage, can restrict its applications, especially when the electrical co-operating surfaces are required to disconnect and re-connect for multiple times. In this case, the stabilization materials can be removed as a result of the relative motion of co-operating surfaces during disconnecting and re-connecting, which rapidly exhausts the stabilization effects. Besides, the leakage of fluid stabilization materials might contaminate the devices as well. Thus, a material which can equally or better improve the performance of electrical contact surfaces that can be quickly solidified on the co-operating electrical contact surfaces is in need.

Recently, much attention has been devoted to the amount of solvent which enters the atmosphere from coatings and related chemical products. In the early 1970s, around 90% of industrial coatings were low solids in nature. In fact, industrial and architectural coatings were characterized as being solvent borne. Ultraviolet (UV) curing is a fast curing process in which UV light with high intensity is used for polymerization reaction that instantly cures coatings. It is a low temperature, solvent free and high speed process which can be successfully used for temperature-sensitive electrical substrates. The UV curing process is principally determined by the desired application of coatings. In this invention, a new gel-like UV-curable material is developed to enhance the electrical current flow characteristics of co-operating electrical contact surfaces. These UV-curable materials can deliver much more efficient and ecologically friendly alternatives to thermally cured systems.

SUMMARY OF THE INVENTION

A first embodiment provides an electrical contact comprising: a first contact surface; a second contact surface; and a coating dispersed on at least one of the first or second contact surfaces, where the coating includes the cured product of a telechelic polypropylene glycol-polyethylene glycol multi-block polymer.

A second embodiment provides an electrical contact as in the preceding embodiment, where telechelic polypropylene glycol-polyethylene glycol multi-block polymer is selected from the group consisting of diacrylate polypropylene glycol-block-polyethylene glycols, dimethacrylate polypropylene glycol-block-polyethylene glycols, diacrylate polypropylene glycol-block-polyethylene glycol-block-polypropylene glycols, dimethacrylate polypropylene glycol-block-polyethylene glycol-block-polypropylene glycols, diacrylate polyethylene glycol-block-polypropylene glycol-block-polyethylene glycols, dimethacrylate polyethylene glycol-block-polypropylene glycol-block-polyethylene glycols, diacrylate polypropylene glycol-block-polyethylene glycol-block-polypropylene glycol-block-polyethylene glycols, dimethacrylate polypropylene glycol-block-polyethylene glycol-block-polypropylene glycol-block-polyethylene glycols, diacrylate polyethylene glycol-block-polypropylene glycol-block-polyethylene glycol-block-polypropylene glycols, dimethacrylate polyethylene glycol-block-polypropylene glycol-block-polyethylene glycol-block-polypropylene glycols, and combinations thereof.

A third embodiment provides an electrical contact as in any preceding embodiments, where the telechelic polypropylene glycol-polyethylene glycol multi-block polymer is defined by the formula:

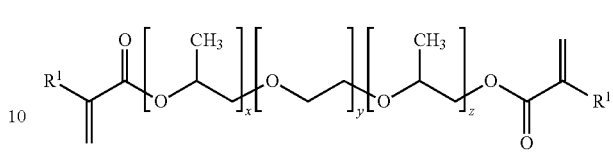

where each $R^1$ is a hydrogen or a methyl group, x is from about 5 to about 30 y is from about 5 to about 30, and z is from about 5 to about 30.

A fourth embodiment provides an electrical contact as in any preceding embodiments, where the telechelic polypropylene glycol-polyethylene glycol multi-block polymer is defined by the formula:

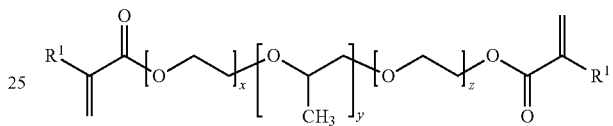

where each $R^1$ is a hydrogen or a methyl group, x is from about 5 to about 30 y is from about 5 to about 30, and z is from about 5 to about 30.

A fifth embodiment provides an electrical contact as in any preceding embodiments, where the coating further includes the cured product of a reactive diluent.

A sixth embodiment provides an electrical contact as in any preceding embodiments, where the reactive diluent is a telechelic polyethylene glycol oligomers or a mono-functional polyethylene glycol oligomers.

A seventh embodiment provides an electrical contact as in any preceding embodiments, where the reactive diluent is a poly(ethylene glycol) diacrylate or poly(ethylene glycol) dimethacrylate defined by the following formula:

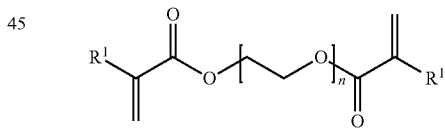

where each $R^1$ is a hydrogen or a methyl group and n is from about 5 to about 9.

An eighth embodiment provides an electrical contact as in any preceding embodiments, where the reactive diluent is a poly(ethylene glycol) methyl ether acrylate or poly(ethylene glycol) methyl ether methacrylate defined by the following formula:

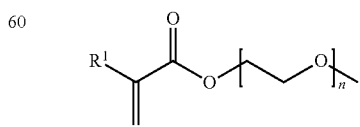

where $R^1$ is a hydrogen or a methyl group and n is from about 5 to about 9.

A ninth embodiment provides an electrical contact as in any of the preceding embodiments, where the coating further includes a wetting agent.

A tenth embodiment provides an electrical contact as in any of the preceding embodiments, where the coating further includes a photoinitiator.

An eleventh embodiment provides an electrical contact as in any of the preceding embodiments, where the coating is a gel.

A twelfth embodiment provides an electrical contact as in any of the preceding embodiments, where the telechelic polypropylene glycol-block-polyethylene glycol-block-polypropylene glycol polymer has a number average molecular weight of about 2500 to about 3000 g/mol.

A thirteenth embodiment provides an electrical contact as in any of the preceding embodiments, where the coating has a thickness from about 1 nm μm to about 3000 nm.

A fourteenth embodiment provides an electrical contact as in any of the preceding embodiments, where the coating is self-healing.

A fifteenth embodiment provides an electrical contact as in any of the preceding embodiments, where the first contact surface and the second contact surface are each independently made from a metal selected from gold, silver, copper, and combinations thereof.

A sixteenth embodiment provides an electrical contact as in any of the preceding embodiments, where the electrical contact is selected from electrical connectors, relays, switches, potentiometers, and faders.

A seventeenth embodiment provides a method of stabilizing an electrical contact comprising: providing an electrical contact that includes a first contact surface and a second contact surface; a coating at least one of the first or second contact surfaces with a curable coating composition that includes a telechelic polypropylene glycol-polyethylene glycol multi-block polymer; and curing the curable coating composition.

An eighteenth embodiment provides a method as in any of the preceding embodiments, where the curable coating composition includes a photoiniator, and the step of curing the curable coating composition is performed by irradiating the curable coating composition with UV light.

A nineteenth embodiment provides a method as in any of the preceding embodiments, where the telechelic polypropylene glycol-polyethylene glycol multi-block polymer is selected from the group consisting of diacrylate polypropylene glycol-block-polyethylene glycols, dimethacrylate polypropylene glycol-block-polyethylene glycols, diacrylate polypropylene glycol-block-polyethylene glycol-block-polypropylene glycols, dimethacrylate polypropylene glycol-block-polyethylene glycol-block-polypropylene glycols, diacrylate polyethylene glycol-block-polypropylene glycol-block-polyethylene glycols, dimethacrylate polyethylene glycol-block-polypropylene glycol-block-polyethylene glycols, diacrylate polypropylene glycol-block-polyethylene glycol-block-polypropylene glycol-block-polyethylene glycols, dimethacrylate polypropylene glycol-block-polyethylene glycol-block-polypropylene glycol-block-polyethylene glycols, diacrylate polyethylene glycol-block-polypropylene glycol-block-polyethylene glycol-block-polypropylene glycols, dimethacrylate polyethylene glycol-block-polypropylene glycol-block-polyethylene glycol-block-polypropylene glycols, and combinations thereof.

A twentieth embodiment provides a method as in any of the preceding embodiments, where the telechelic polypropylene glycol-polyethylene glycol multi-block polymer is defined by the formula:

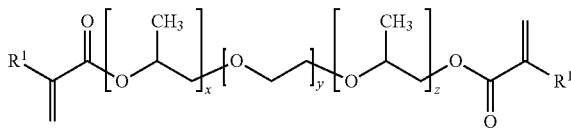

where each $R^1$ is a hydrogen or a methyl group, x is from about 5 to about 30 y is from about 5 to about 30, and z is from about 5 to about 30.

A twenty-first embodiment provides a method as in any of the preceding embodiments, where the telechelic polypropylene glycol-polyethylene glycol multi-block polymer is defined by the formula:

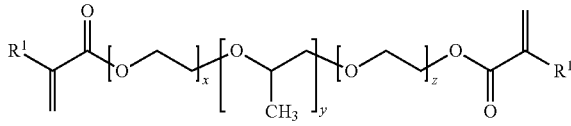

where each $R^1$ is a hydrogen or a methyl group, x is from about 5 to about 30 y is from about 5 to about 30, and z is from about 5 to about 30.

A twenty-second embodiment provides a method as in any of the preceding embodiments, where the curable coating composition further includes a reactive diluent.

A twenty-third embodiment provides a method as in any of the preceding embodiments, where the reactive diluent is a telechelic polyethylene glycol oligomers or a monofunctional polyethylene glycol oligomers.

A twenty-fourth embodiment provides a method as in any of the preceding embodiments, where the reactive diluent is a poly(ethylene glycol) diacrylate or poly(ethylene glycol) dimethacrylate defined by the following formula:

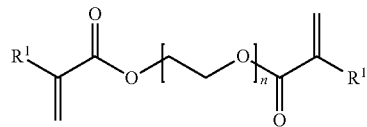

where each $R^1$ is a hydrogen or a methyl group and n is from about 5 to about 9.

A twenty-fifth embodiment provides a method as in any of the preceding embodiments, where the reactive diluent is a poly(ethylene glycol) methyl ether acrylate or poly(ethylene glycol) methyl ether methacrylate defined by the following formula:

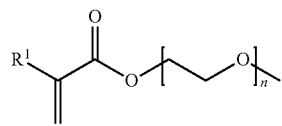

where $R^1$ is a hydrogen or a methyl group and n is from about 5 to about 9.

A twenty-sixth embodiment provides a method as in any of the preceding embodiments, where the curable coating composition further includes a wetting agent.

A twenty-seventh embodiment provides a method as in any of the preceding embodiments, where the curable coating composition is solvent free or essentially solvent free.

A twenty-eighth embodiment provides a method as in any of the preceding embodiments, where the step of curing the curable coating composition results in a cured coating composition in the form of a gel.

DETAILED DESCRIPTION OF ILLUSTRATIVE EMBODIMENTS

Figure 1:
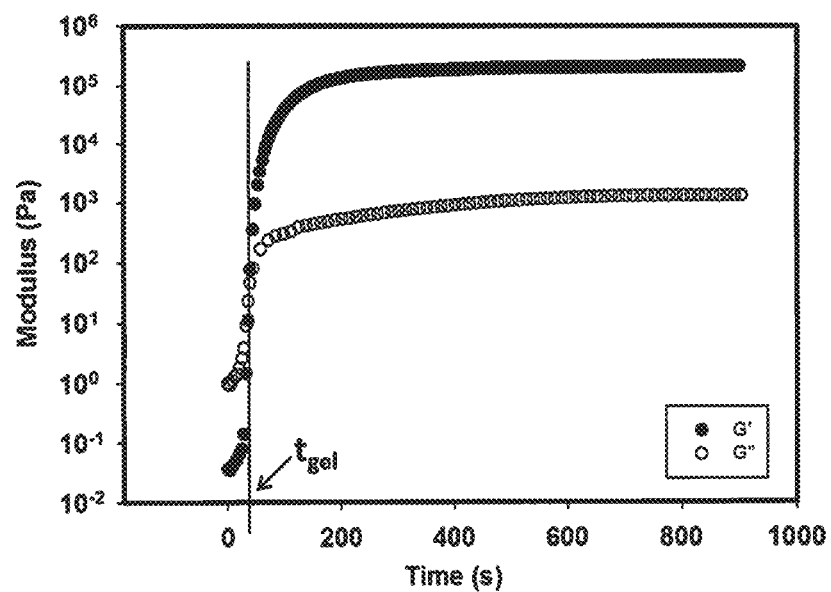
FIG. 1 provides a chart of the development of the elastic (G') and viscous (G") modulus as a function of time for formulation M-9-3.8 under a constant frequency of 6 rad/s.

According to one or more embodiments, a stabilized electrical contact may be prepared by coating an electrical contact surface with a telechelic polypropylene glycol-polyethylene glycol multi-block polymer and then curing the telechelic polypropylene glycol-polyethylene glycol multi-block polymer. Advantageously, it has been found that the stabilized electrical contacts exhibit improved performance. For the purpose of the present specification, the telechelic polypropylene glycol-polyethylene glycol multi-block polymer may be referred to as the multi-block polymer.

As those skilled in the art will appreciate, an electrical contact includes two surfaces made of an electrically conductive material. The two surfaces are each generally referred in the art as contacts. For the purpose of this disclosure, each contact, or surface made of an electrically conductive material, in an electrical contact, may be referred to as a contact surface. Metals are exemplary electrically conductive material. Suitable metals for use as electrically conductive materials include, include but are not limited to, copper, silver, and gold. In one or more embodiments, one or more of the metals listed above may be used in an alloy. An exemplary alloy is indium tin oxide (ITO), which may be used for coating such as ITO glass.

The two contact surfaces in an electrical contact function co-operatively. When the two contact surfaces touch, an electrical current may pass from a first contact surface to a second contact surface. When the two contact surfaces are separated, for example by an insulating gap such as air, vacuum, or other another electrically insulating medium, a current cannot pass from a first contact surface to a second contact surface.

Any electrical contact may be stabilized using the telechelic polypropylene glycol-polyethylene glycol multi-block polymer. Exemplary electrical contacts that may be stabilized include electrical connectors, relays, switches, potentiometers, and faders. Suitable electronics that may benefit from contact stabilization include audio equipment, video equipment, computers, telephones and cellular phones.

In one or more embodiments, a stabilized electrical contact may be prepared by providing an electrical contact that includes a first contact surface and second contact surface, coating at least one of the first or second contact surfaces with a curable coating composition, and then curing the curable coating composition.

In one or more embodiments, the curable coating composition includes a includes a telechelic polypropylene glycol-polyethylene glycol multi-block polymer. The telechelic polypropylene glycol-polyethylene glycol multi-block polymer has two reactive end groups capable of reacting or undergoing polymerization when the curable coating composition is cured to produce a crosslinked polymer. In one or more embodiments, the reactive end groups of the telechelic polypropylene glycol-polyethylene glycol multi-block polymer are acrylate functional groups or methacrylate functional groups.

In one or more embodiments, the telechelic polypropylene glycol-polyethylene glycol multi-block polymer may be characterized by its number average molar mass (Mn). In one or more embodiments, the number average molar mass of the telechelic polypropylene glycol-polyethylene glycol multi-block polymer is at least 2000 g/mol, in other embodiments at least 2200 g/mol, in other embodiments at least 2400 g/mol, in other embodiments at least 2500 g/mol, and in other embodiments at least 2600 g/mol.

In one or more embodiments, the number average molar mass of the telechelic polypropylene glycol-polyethylene glycol multi-block polymer is at most 2900 g/mol, in other embodiments at most 3000 g/mol, in other embodiments at most 3100 g/mol, in other embodiments at most 3200 g/mol, and in other embodiments at most 3300 g/mol. In one or more embodiments, the number average molar mass of the telechelic polypropylene glycol-polyethylene glycol multi-block polymer is from about 2000 g/mol to about 3300 g/mol, in other embodiments from about 2200 g/mol to about 3200 g/mol, in other embodiments from about 2400 g/mol to about 3100 g/mol, in other embodiments from about 2500 g/mol to about 3000 g/mol, and in other embodiments from about 2600 g/mol to about 2900 g/mol.

In one or more embodiments, the telechelic polypropylene glycol-polyethylene glycol multi-block polymer may have two or more alternating blocks propylene glycol repeating units and polyethylene glycol repeating units. In one or more embodiments, the telechelic polypropylene glycol-polyethylene glycol multi-block polymer may have from about 2 to about blocks.

In one or embodiments, the telechelic polypropylene glycol-polyethylene glycol multi-block polymer may be a di-block copolymer represented by the formula: A-B, where A and B are different polymer blocks selected from polypropylene glycol or polyethylene glycol. In one or embodiments, the telechelic polypropylene glycol-polyethylene glycol multi-block polymer may be a tri-block copolymer represented by the formula: A-B-A, where A and B are different polymer blocks selected from polypropylene glycol or polyethylene glycol. In one or embodiments, the telechelic polypropylene glycol-polyethylene glycol multi-block polymer may be a tetra-block copolymer represented by the formula: A-B-A-B, where A and B are different polymer blocks selected from polypropylene glycol or polyethylene glycol.

In one or more embodiments, where the reactive functional groups of the telechelic polypropylene glycol-polyethylene glycol multi-block polymer are acrylate groups, the telechelic polypropylene glycol-polyethylene glycol multi-block polymer may be referred to as a diacrylate polypropylene glycol-polyethylene glycol multi-block polymer. In one or more embodiments, where the reactive functional groups of the telechelic polypropylene glycol-polyethylene glycol multi-block polymer are methacrylate groups, the telechelic polypropylene glycol-polyethylene glycol multi-block polymer may be referred to as a dimethacrylate polypropylene glycol-polyethylene glycol multi-block polymer.

Exemplarily telechelic polypropylene glycol-polyethylene glycol multi-block polymer include diacrylate polypropylene glycol-block-polyethylene glycols, dimethacrylate polypropylene glycol-block-polyethylene glycols, diacrylate polypropylene glycol-block-polyethylene glycol-block-polypropylene glycols, dimethacrylate polypropylene glycol-block-polyethylene glycol-block-polypropylene glycols, diacrylate polyethylene glycol-block-polypropylene glycol-block-polyethylene glycols, dimethacrylate polyethylene glycol-block-polypropylene glycol-block-polyethylene glycols, diacrylate polyethylene glycol-block-polypropylene glycol-block-polyethylene glycol-block-polypropylene glycols, dimethacrylate polypropylene glycol-block-polyethylene glycol-block-polypropylene glycol-block-polyethylene glycols, diacrylate polyethylene glycol-block-polypropylene glycol-block-polyethylene glycol-block-polypropylene glycols, and dimethacrylate polyethylene glycol-block-polypropylene glycol-block-polyethylene glycol-block-polypropylene glycols.

In one or more embodiments, where the telechelic polypropylene glycol-polyethylene glycol multi-block polymer is a diacrylate polypropylene glycol-block-polyethylene glycol-block-polypropylene glycol polymer or a dimethacrylate polypropylene glycol-block-polyethylene glycol-block-polypropylene glycol the multiblock polymer may be defined by the following formula:

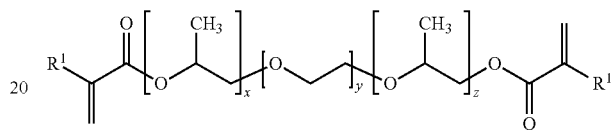

where each $R^1$ is a hydrogen or a methyl group, x is from about 5 to about 30 y is from about 5 to about 30, and z is from about 5 to about 30. In one or more embodiments, x may be from about 7 to 25 in other embodiments from about 10 to 20, and in other embodiments from about 12 to 15. In one or more embodiments, y may be from about 7 to 25 in other embodiments from about 10 to 20, and in other embodiments from about 12 to 15. In one or more embodiments, z may be from about 7 to 25 in other embodiments from about 10 to 20, and in other embodiments from about 12 to 15.

In one or more embodiments, where the telechelic polypropylene glycol-polyethylene glycol multi-block polymer is a diacrylate polyethylene glycol-block-polypropylene glycol-block-polyethylene glycol polymer or a dimethacrylate polyethylene glycol-block-polypropylene glycol-block-polyethylene glycol polymer the multiblock polymer may be defined by the following formula:

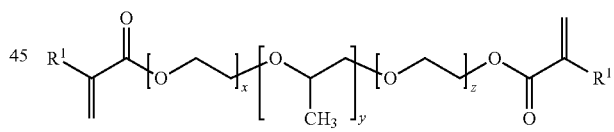

where each $R^1$ is a hydrogen or a methyl group, x is from about 5 to about 30 y is from about 5 to about 30, and z is from about 5 to about 30. In one or more embodiments, x may be from about 7 to 25 in other embodiments from about 10 to 20, and in other embodiments from about 12 to 15. In one or more embodiments, y may be from about 7 to 25 in other embodiments from about 10 to 20, and in other embodiments from about 12 to 15. In one or more embodiments, z may be from about 7 to 25 in other embodiments from about 10 to 20, and in other embodiments from about 12 to 15.

In one or more embodiments, the entirely of the curable coating composition may be telechelic polypropylene glycol-polyethylene glycol multi-block polymer. In other embodiments, the curable coating composition may include other components such as, reactive diluents, initiators (such as photoinitators), wetting agents, and combinations thereof. In one or more embodiments, the curable coating composition may be characterized by the percentage of the telechelic polypropylene glycol-polyethylene glycol multi-block polymer in the curable coating composition. In one or more embodiment, the curable coating composition is at least 25% in other embodiments at least 30%, in other embodiments at least 35%, and in other embodiments at least 40% by weight telechelic polypropylene glycol-polyethylene glycol multi-block polymer. In one or more embodiments the curable coating composition is at most 95%, in other embodiments at most 90%, in other embodiments at most 75%, in other embodiments at most 70%, in other embodiments at most 65%, and in other embodiments at most 60% by weight telechelic polypropylene glycol-polyethylene glycol multi-block polymer. In one or more embodiment, the curable coating composition is from about 25% to about 75%, in other embodiments from about 30% to about 70%, in other embodiments from about 35% to about 65%, and in other embodiments from about 40% to about 60% by weight telechelic polypropylene glycol-polyethylene glycol multi-block polymer.

In one or more embodiments, the curable coating composition includes a reactive diluent. It has been found that when certain reactive diluents are included in the curable coating composition they may be used to help control the hardness or softness the resultant cured coating. Suitable reactive diluents for adjusting the hardness of the cured coating include, but are not limited to telechelic polyethylene glycol oligomers and mono-functional polyethylene glycol oligomers.

In one or more embodiments, the telechelic polyethylene glycol oligomer or mono-functional polyethylene glycol oligomer may be characterized by its number average molar mass (Mn). In one or more embodiments, the number average molar mass of the telechelic polyethylene glycol oligomer or mono-functional polyethylene glycol oligomer is at least 250 g/mol in other embodiments at least 300 g/mol and in other embodiments at least 350 g/mol. In one or more embodiments, the number average molar mass of the telechelic polyethylene glycol oligomer or mono-functional polyethylene glycol oligomer is at most 900 g/mol in other embodiments at most 700 g/mol and in other embodiments at most 500 g/mol. In one or more embodiments, the number average molar mass of the telechelic polyethylene glycol oligomer or mono-functional polyethylene glycol oligomer is from about 250 g/mol to about 900 g/mol, in other embodiments from about 300 g/mol to about 700 g/mol, and in other embodiments from about 350 g/mol to about 500 g/mol, In one or more embodiments, where the reactive functional groups of the telechelic polyethylene glycol oligomer are acrylate groups, the telechelic polyethylene glycol oligomer may be referred to as a poly(ethylene glycol) diacrylate. In one or more embodiments, where the reactive functional groups of the telechelic polyethylene glycol oligomer are methacrylate groups, the telechelic polyethylene glycol oligomer may be referred to as a poly(ethylene glycol) dimethacrylate. In one or more embodiments, where the reactive functional group of the mono-functional polyethylene glycol oligomer is a methacrylate groups, the mono-functional polyethylene glycol oligomer may be referred to as a poly(ethylene glycol) methyl ether acrylate. In one or more embodiments, where the reactive functional group of the mono-functional polyethylene glycol oligomer is an acrylate groups, the mono-functional polyethylene glycol oligomer may be referred to as a poly(ethylene glycol) methyl ether methacrylate.

In one or more embodiments, the poly(ethylene glycol) diacrylate or poly(ethylene glycol) dimethacrylate may be defined by the following formula

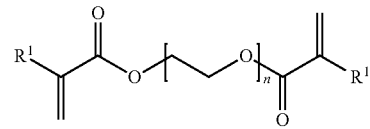

where each $R^1$ is a hydrogen or a methyl group and n is from about 4 to about 10. In one or more embodiments, n may be from about 5 to 9, and in other embodiments from about 6 to about 7.

In one or more embodiments, the poly(ethylene glycol) methyl ether acrylate or poly(ethylene glycol) methyl ether methacrylate may be defined by the following formula

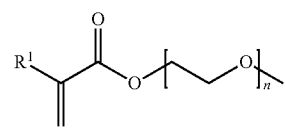

where $R^1$ is a hydrogen or a methyl group and n is from about 4 to about 10. In one or more embodiments, n may be from about 5 to 9, and in other embodiments from about 6 to about 7.

In one or more embodiments, the curable coating composition may be characterized by the percentage of the reactive diluent in the curable coating composition. In one or more embodiment, the curable coating composition is at least 25% in other embodiments at least 30%, in other embodiments at least 35%, and in other embodiments at least 40% by weight reactive diluent. In one or more embodiments the curable coating composition is at most 95%, in other embodiments at most 90%, in other embodiments at most 75%, in other embodiments at most 70%, in other embodiments at most 65%, and in other embodiments at most 60% by weight reactive diluent. In one or more embodiment, the curable coating composition is from about 25% to about 75%, in other embodiments from about 30% to about 70%, in other embodiments from about 35% to about 65%, and in other embodiments from about 40% to about 60% by weight reactive diluent.

In one or more embodiments, the curable coating composition includes a wetting agent. It has been found that a wetting agent may be used in the curable composition to lower the surface tension of the curable composition and thus allow it to spread more easily on the contact surfaces. In one or more embodiments, the wetting agent may be a silicone-containing wetting agent. Suitable silicone-containing wetting agents include polyether modified polydimethylsiloxanes such as BYK-333, available from BYK Additives & Instruments.

In one or more embodiments, the curable coating composition may be characterized by the percentage of the wetting agent in the curable coating composition. In one or more embodiment, the curable coating composition is at least 0.25% in other embodiments at least 0.30%, in other embodiments at least 0.35%, and in other embodiments at least 0.40% by weight wetting agent. In one or more embodiment, the curable coating composition is at most 0.75%, in other embodiments at most 0.70%, in other embodiments at most 0.65%, and in other embodiments at most 0.60% by weight wetting agent. In one or more embodiment, the curable coating composition is from about 0.25% to about 0.75%, in other embodiments from about 0.30% to about 0.70%, in other embodiments from about 0.35% to about 0.65%, and in other embodiments from about 0.40% to about 0.60% by weight wetting agent.

In one or more embodiment the curable coating composition may be cured through UV light. In these or other embodiments, the curable coating composition may include a photoinitiator. Exemplary photoinitiators include 2-hydroxy-2-methylpropiophenone.

In one or more embodiments, the curable coating composition may be characterized by the percentage of the photoinitiator in the curable coating composition. In one or more embodiment, the curable coating composition is at least 0.3%, in other embodiments at least 0.5%, and in other embodiments at least 0.7% by weight photoinitiator. In one or more embodiment, the curable coating composition is at most 3%, in other embodiments at most 2%, and in other embodiments at most 1% by weight photoinitiator. In one or more embodiment, the curable coating composition is from about 0.3% to about 3%, in other embodiments from about 0.5% to about 2%, and in other embodiments from about 0.7% to about 1% by weight photoinitiator.

In one or more embodiments, the curable coating composition is essentially solvent free. In these or other embodiments, the curable coating composition does not include a volatile organic compounds. In one or more embodiments, the curable coating composition includes less than 10% solvent, in other embodiments less than 5% solvent, in other embodiments less than 3% solvent, and in other embodiments less than 1% solvent by weight. In one or more embodiments, the curable coating composition is solvent free.

In one or more embodiments, a method of stabilizing an electrical contact may include providing an electrical contact that includes a first contact surface and second contact surface, coating at least one of the first or second contact surfaces with the curable coating composition; and then curing the curable coating composition. In one or more embodiments, one of the first or second contact surfaces is coated with the curable coating composition. In other embodiments, both of the first and second contact surfaces are coated with the curable coating composition.

The curable coating composition may be coated onto a contact surface by various methods. Suitable methods for coating the curable coating composition include flow coating and spin coating.

As noted above, flow coating may be used to coat the curable coating composition onto a contact surface include flow coating. Flow coating has advantageously been found to provide a curable composition with a uniform thickness. In these embodiments, the flow coating device includes a knife blade secured at fixed distance away from the contact surface. A small amount of the curable coating composition is deposited or wicked between the contact surface and the knife blade. The blade or contact surface is then moved relative to each other to produce a thin coating with desired thickness. The flow coating process is considered as a result of the competition between the capillary forces holding the curable composition between the knife blade and the contact surface and the frictional drag exerted on that same curable composition when the blade (or contact surface) is pulled away.

The curable coating composition may be cured by various methods suitable for reacting the reactive functional groups of the telechelic polypropylene glycol-polyethylene glycol multi-block polymer (and optionally any reactive diluents).

In one or more embodiments, the curable coating composition may be partially cured prior to coating. In these or other embodiments, the coating is cured to an extent that allow coating to still be coated onto a contact and then curing is completed after the partially cured coating is applied to the contact.

In one or more embodiments, where the telechelic polypropylene glycol-polyethylene glycol multi-block polymer includes methacrylate or acrylate functional groups a UV initiator may be included to allow the curable composition to be UV cured.

The cured coating should be sufficiently thick enough to fill the gaps between the contact surfaces, but not so thick that the asperities on the electrical contact surface cannot cut through the coating. In one or more embodiments, the cured coating may be characterized by the coatings thickness. In one or more embodiments, the thickness of the cured coating is at least 1 m, in other embodiments at least 3 nm, in other embodiments at least 5 nm, in other embodiments at least 7 nm, and in other embodiments at least 10 nm In one or more embodiments, the thickness of the cured coating is at most 3000 nm, in other embodiments at most 2000 nm, in other embodiments at most 2000 nm, in other embodiments at most 2500 nm, in other embodiments at most 1000 nm, in other embodiments at most 500 nm, in other embodiments at most 100 nm, in other embodiments at most 50 nm, in other embodiments at most 45 nm, in other embodiments at most 40 nm, in other embodiments at most 35 nm, and in other embodiments at most 30 nm.

In one or more embodiments, the cured coating composition is self-healing. In these or other embodiments, the cured coating may be repeatedly penetrated by the asperities of the electrical contact surface several times without showing any wear.

In one or more embodiments, the cured coating composition is not a fluid at room temperature (20° C.-25° C.). In these or other embodiments, the cured coating composition of a stabilized electrical contact does not flow or leak when the contact surfaces are connected and disconnected. In or more embodiments, the cured coating composition is a gel.

In one or more embodiments, the cured coating composition may decrease the electronic noise. Those skilled in the art recognize electronic noise as unwanted disturbances superposed on a useful signal that tend to obscure its information content. In one or more embodiments, the stabilized electrical contact shows reduced noise when compared to an unstabilized contact.

While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

EXAMPLES

Example Set 1

Materials and Synthesis

Poly(propylene glycol)-block-poly(ethylene glycol)-block-poly(propylene glycol) (PPG-b-PEG-b-PPG) ($M_n$~2,700 g/mol) was purchased from Sigma-Aldrich. Methacryloyl chloride, trimethylamine (TEA), 2-hydroxy-2-methylpropiophenone (photoinitiator), and dichloromethane were purchased from Sigma-Aldrich and used without further purification. BYK®-333 was kindly provided by BYK Additives & Instruments and added as a wetting agent. Poly(ethylene glycol) dimethacrylate (PEGDMA) with the average molecular weights of ~350 g/mol (repeating unit (n) of ~5) was purchased from Polysciences Inc. Methoxy poly(ethylene glycol) monomethacrylate (MPEGMA) with the average molecular weights of 300 g/mol (n~5) and 500 g/mol (n~9) were purchased from Sigma-Aldrich and used as received. Both PEGDMA and MPEGMA were used as reactive diluents and their chemical structures are shown in Scheme 1.

Scheme 1.
Chemical structure of MPEGMA and PEGDMA reactive diluents.

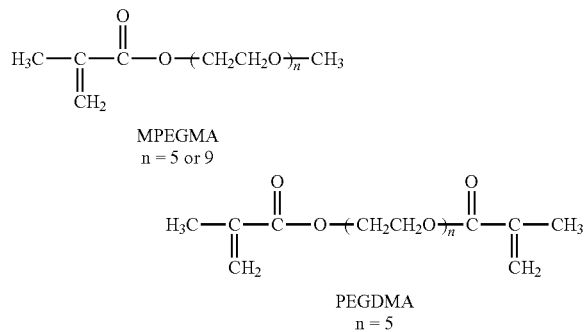

MPEGMA
n = 5 or 9

PEGDMA
n = 5

PPG-b-PEG-b-PPG dimethacrylate was synthesized as follows. PPG-b-PEG-b-PPG ($M_n$~2,700 g/mol) (54 g, 0.020 mol) was dissolved in 100 mL anhydrous dichloromethane into a three-neck round bottom flask. TEA (4.86 g, 0.048 mol) was then added at 0° C. in an ice bath. Methacryloyl chloride (5.00 g, 0.048 mol) was dissolved in 24 mL anhydrous dichloromethane and added dropwise to the PPG-b-PEG-b-PPG solution by syringe pump. Then, the mixture was stirred for 24 h at room temperature under nitrogen to complete the reaction. The resultant mixture was later filtered by vacuum filtration to separate the insoluble triethylamine salts, followed by neutral alumina filtration in order to remove excess triethylamine. Then, rotavap was used to remove excess dichloromethane solvent. Finally, the purified product was dried in a vacuum oven at room temperature for 24 h. The synthesis pathway for the preparation of PPG-b-PEG-b-PPG dimethacrylate is shown in Scheme 2.

Scheme 2. Synthesis of PPG-b-PEG-b-PPG dimethacrylate.

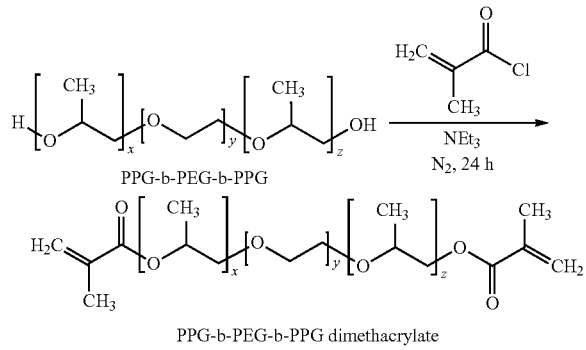

PPG-b-PEG-b-PPG

PPG-b-PEG-b-PPG dimethacrylate

The synthesized PPG-b-PEG-b-PPG dimethacrylate was characterized by Fourier transform infrared (FT-IR) spectroscopy with a Thermo Scientific Nicolet iS50 FT-IR spectrometer using the transmission mode at a resolution of 8 cm$^{-1}$ and averaging from 512 scans. The compositions were determined using $^1$H NMR (Varian NMRS-500 nuclear magnetic resonance instrument) operating at 500 MHz with deuterium oxide (D$_2$O) as a solvent. The molecular weight and poly dispersity index (PDI) of the prepared compounds were determined by gel permeation chromatography (GPC, Waters) coupled with Bryce-type differential refractometer (RI) as a detector and TSK gel SuperMultiporePW-H (TOSOH) column. Polyethylene oxide (PEO) and polyethylene glycol (PEG) were used as standards for the calibration. The samples were analyzed by using 75 wt. % aqueous solution of these salts; sodium azide (NaN$_3$), potassium phosphate monobasic (KH$_2$PO$_4$), sodium phosphate dibasic dodecahydrate (Na$_2$HPO$_4$.12H$_2$O), and sodium sulfate (Na$_2$SO$_4$). The flow rate was 0.5 mL/min and polymer concentration was 1 mg/mL solvent.

1.2 Sample Preparation

The UV curable electrical contact stabilization materials developed in this study consisted of the synthesized PPG-b-PEG-b-PPG dimethacrylate, mono-functional (MPEGMA, n~5 or 9) or di-functional (PEGDMA, n~5) reactive diluents, photoinitiator (2-hydroxy-2-methylpropiophenone), and a wetting agent. Each formulation was prepared by first mixing the PPG-b-PEG-b-PPG dimethacrylate and reactive diluent with different molar ratios (1.0:3.8, 1.0:5.7, and 1.0:8.6) in an amber glass vial. The photoinitiator (1 wt. %) and wetting agent (0.5 wt. %) were then added to each mixture. The resulting mixtures were mixed by a vortex for 30 s and the homogeneous solutions were finally obtained at room temperature. All formulations are summarized in Table 1. As an example, formulation code M-5-3.8 indicates the formulation containing mono-functional MPEGMA reactive diluent (M) having 5 repeating units and the molar ratio (reactive diluent to PPG-b-PEG-b-PPG dimethacrylate) of 3.8.

TABLE 1

Summary of all UV-curable formulations developed.

| Formulation code[a] | Reactive diluent | Repeating unit (n)[b] | Molar ratio[c] |
|---|---|---|---|
| M-5-3.8 | MPEGMA[d] | 5 | 3.8 |
| D-5-3.8 | PEGDMA[e] | 5 | 3.8 |
| M-9-3.8 | MPEGMA | 9 | 3.8 |
| M-9-5.7 | MPEGMA | 9 | 5.7 |
| M-9-8.6 | MPEGMA | 9 | 8.6 |

[a]all formulations are based on PPG-b-PEG-b-PPG dimethacrylate, reactive diluent, photoinitiator, and wetting agent.
[b]Number of repeating units in reactive diluents.
[c]Molar ratio of reactive diluent to PPG-b-PEG-b-PPG dimethacrylate.
[d]Mono-functional MPEGMA reactive diluent.
[e]Di-functional PEGDMA reactive diluent.

1.3 Rheological Measurements before UV Curing

The pre-cured rheological properties of the samples were characterized by a dynamic strain controlled rheometer (TA Instruments ARES-G2). All the experiments were performed on a parallel plate fixture with a diameter of 25 mm at 25° C. The linear viscoelastic (LVE) range of each sample was determined by a dynamic strain sweep followed by a frequency sweep.

1.4 Real-time Rheology during UV Curing

A Malvern Instruments (Bohlin Gemini 200) rheometer system with a parallel plate fixture of 25 mm diameter was utilized to track the dynamic rheological properties during UV curing. A specially designed transparent UV curing bottom plate was placed in this system to allow the UV radiation to pass through. The UV radiation was generated by a S2000 Omnicure Spot UV lamp at a fixed intensity of 40 mW/cm² throughout each experiment. The intensity was calibrated by a UV Power Puck II radiometer prior to each experiment. The sample thickness was kept at ~500 μm and all the experiments were performed at 25° C. For the time sweep, all the samples were exposed to UV radiation at t=0 with a frequency value of 1.0, 6.0, or 10.0 rad/s. The frequency sweep was applied immediately after the UV exposure and was terminated at different time periods to study the gelation behavior of these materials. All the dynamic oscillatory measurements were carried out under controlled strain of 0.02 in order to endure the linear viscoelastic regime of all samples.

1.5 Real-time FT-IR Spectroscopy

The FT-IR spectra were recorded by a Alpha-T (Bruker Optics, Billerica, Mass., USA) transmission mode in junction with an external UV lamp (S2000 Omnicure). The intensity of UV radiation was maintained at 40 mW/cm² (same as the rheological measurements) for all samples. The pre-cured liquid sample was sandwiched between two KBr crystals with a diameter of 19 mm and then inserted inside the FT-IR spectrometer sample chamber. Each IR spectrum obtained during curing process was an average of six scans with a resolution of 4 cm⁻¹. The C=C stretching vibrations of the vinyl functional groups (~1636 cm⁻¹) were selected to monitor and calculate the conversion rate which could be obtained from the integration of the C=C absorption bands at the beginning of the experiment and any subsequent time t, using the following Eq. 1:

$$X(t) = \frac{A(0) - A(t)}{A(0)} \quad \text{(Eq. 1)}$$

where X(t) is the conversion at time t, A(0) is the area of the initial band, and A(t) is the area at time t.

RESULTS AND DISCUSSION

Rheology Development During UV Curing

The viscosity and modulus of the UV curable materials developed in this study are increased by several orders of magnitude at the end of curing process, namely the sample going through a transition from a liquid state to a solid one. However, the steady shear might disrupt the gel-like structure during this transition. Hence, the dynamic rheological measurements, where a small sinusoidal strain deformation is applied to the sample, were adopted here to monitor the real time development of rheological properties during UV curing. A representative graph of the elastic (G') and viscous (G") modulus for formulation M-9-3.8 (Table 1) as a function of UV curing time is shown in FIG. 1. Prior to the UV exposure, the sample exhibited a typical viscous liquid behavior with a much higher viscous modulus (0.9910 Pa) than elastic modulus (0.0368 Pa). Nevertheless, after being exposed to the UV radiation, both G' and G" values immediately increased with time and G' exceeded G" beyond 37 s, which is in the vicinity of the gel point as already discussed by Winter-Chambon Criterion. The gel point in a chemically crosslinking system is defined as the critical extent of reaction where the polymer chains start forming network and transition from a viscous liquid state to a viscoelastic gel.

After the gel point, the sample showed elastic behavior for the rest of curing process, having the final plateau G' value (t=1200 s) two orders of magnitude greater than the G" value. The G" values leveled off instantly after the gel point and reached plateau whereas the G' values continued increasing, which implied that the sample started to behave more elastic with the almost negligible viscous characteristics. As the curing process further proceeded, the increasing trend of G' values started to decrease gradually, indicating that the reaction rate decreased, which can be ascribed to the reduction of active free radicals. In comparison with the pre-cured sample, there was an over six orders of magnitude increase in the G' values at the end of the UV curing process, suggesting a significant change in the elasticity of the sample.

Figure 2:
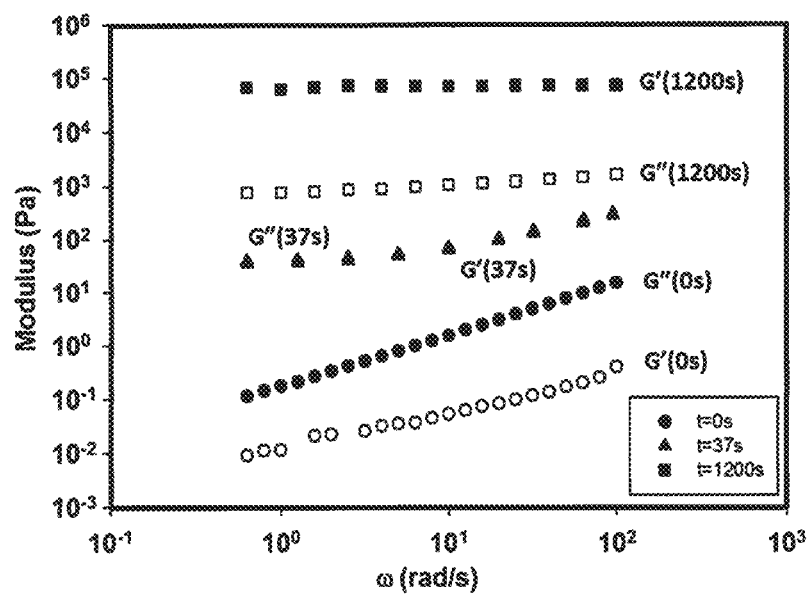
FIG. 2 provides a chart of the elastic (G') and viscous (G") modulus as a function of frequency for formulation M-9-3.8 before (t=0 s) and after UV radiation exposure at time intervals of t=37 and 1200 s.

A frequency sweep was also performed before UV radiation (t=0) and immediately after removing the UV radiation at different time intervals (t=37 and 1200 s), and the results are summarized in FIG. 2. The G' and G" curves at t=0 s further verified the viscous characteristics of the sample prior to the UV exposure, which possessed a much greater G" value than G' throughout the entire testing frequency range. Moreover, both G' and G" were frequency dependent with different slopes, revealing a viscous liquid state. Nevertheless, at t=37 s (around the gel point), the elastic and viscous modulus were almost identical and demonstrated the same dependency on the frequency of oscillation. Note that the graphs in FIG. 2 are plotted on a logarithm scale, meaning that both the G' and G" showed the same power-law behavior (G', G" ~$\omega^n$) with the same exponent n (relaxation exponent, value is 0.5). With G'=G" $\omega^{0.5}$, the steady shear viscosity and equilibrium shear modulus can be obtained using Eq. 2 and Eq. 3:

$$\eta_0 = \lim_{\omega \to 0} (G''/\omega) = C \lim_{\omega \to 0} (\omega^{-0.5}) = \infty \quad \text{(Eq. 2)}$$

$$G_\infty = \lim_{\omega \to 0} (G') = C \lim_{\omega \to 0} (\omega^{-0.5}) = 0 \quad \text{(Eq. 3)}$$

where $\eta_0$ and $G_\infty$ are the steady shear viscosity and equilibrium shear modulus, respectively. $\eta_0 = \infty$ and $G_\infty = 0$ are exactly the features of a material at the liquid/solid transition point. When the sample was further exposed to the UV radiation (t=1200 s), the elastic modulus became nearly two orders of magnitude greater than the viscous modulus throughout the frequency range, and more importantly, independent of the frequency, both of which are characteristics of a highly crosslinked material.

Figure 3:
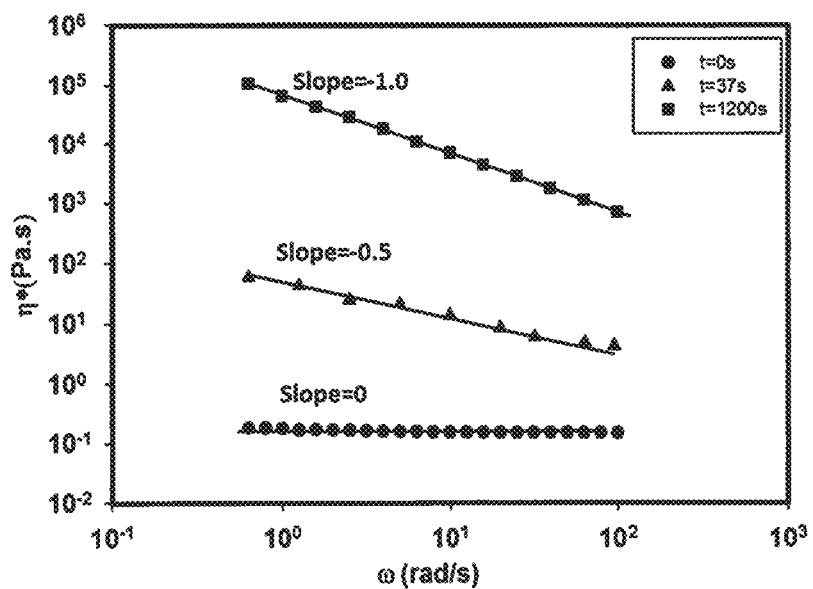
FIG. 3 provides a chart of the complex viscosity ($\eta^*$) vs. frequency of oscillation for formulation M-9-3.8 at three different UV exposure time intervals.

As shown in FIG. 3, the gel point can be alternatively determined from the relationship between complex viscosity ($\eta^*$) and frequency at the corresponding UV exposure time intervals. Generally, $\eta^*$ evolves as the reaction proceeds. Prior to the UV exposure (t=0 s), the sample exhibited a Newtonian fluid behavior over the duration of testing frequency range. The material showed shear thinning behavior for the entire oscillation frequency range after 37 s and 1200 s with the slopes of −0.5 and −1.0, respectively. The shear thinning dynamic rheological behavior also confirmed that the material exhibited crosslinked solid properties. Furthermore, with the slope of $\eta^*$ vs. $\omega$ logarithm curve being −0.5 at t=37 s, namely $\eta^* \sim \omega^{-0.5}$, it could be concluded that the relaxation exponent, n, equaled to 0.5 since $\eta^* \sim \omega^{n-1}$. As stated earlier, n=0.5 is a characteristic behavior of materials at their gel points.

Figure 4:
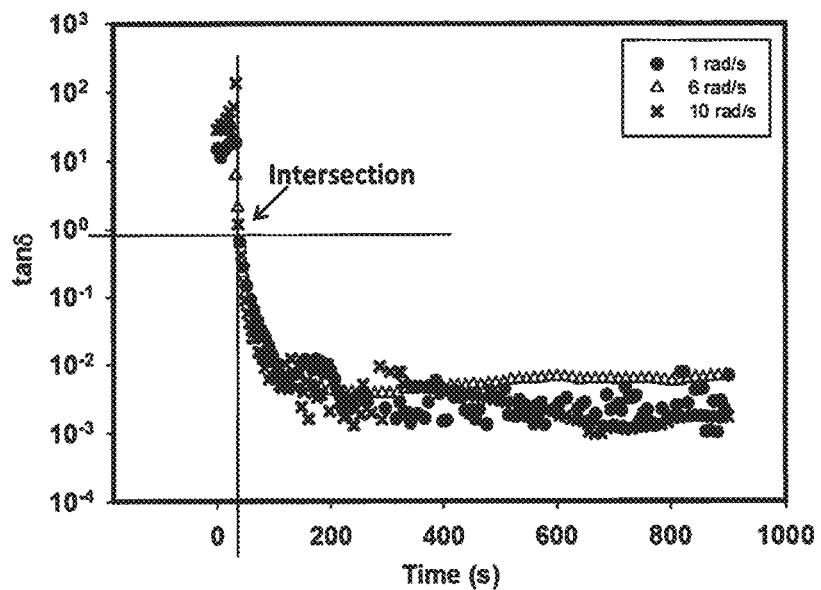
FIG. 4 provides a chart of the tan δ vs. UV exposure time for formulation M-9-3.8 at three different frequencies.

Based on the Winter-Chambon criterion, the dynamic mechanical behaviors of different systems at the gel point obey a power relationship between frequency and dynamic shear moduli, $G'(\omega) \sim G''(\omega) \alpha \omega^n$. In fact, such a relationship allows for easy identification of the gel point using a series of time and/or frequency sweeps. In this study, to further validate the application of Winter-Chambon criteria to the gel point of formulation M-9-3.8, the time sweep of dynamic rheological measurements was performed at three different frequencies (1, 6, and 10 rad/s), and the loss tangent, tan δ values (tan δ=G''/G') were plotted as a function of UV exposure time (FIG. 4). All three tan δ curves crossed over around t=37s, which coincided well with the time at gel point. The tan δ values at the intersection were very close to 1, which indicated that $G'=G'' \sim \omega^{0.5}$. Combining all the results from the dynamic modulus, complex viscosity, and tan δ together, it could be concluded that the gel point for formulation M-9-3.8 happened at t=37 s with a relaxation exponent of 0.5, demonstrating a linear flexible polymeric system.

Effect of Reactive Diluents

Reactive diluents were added to all formulations to reduce the viscosity of the liquid precursor, hence improving their processability. It is also well known that reactive diluents can significantly affect the coating materials in terms of appearance, curing kinetics, rheological properties, and mechanical properties. Consequently, the effects of reactive diluents, including the functionality, molecular weight, and content were investigated and discussed in this study.

Figure 5:
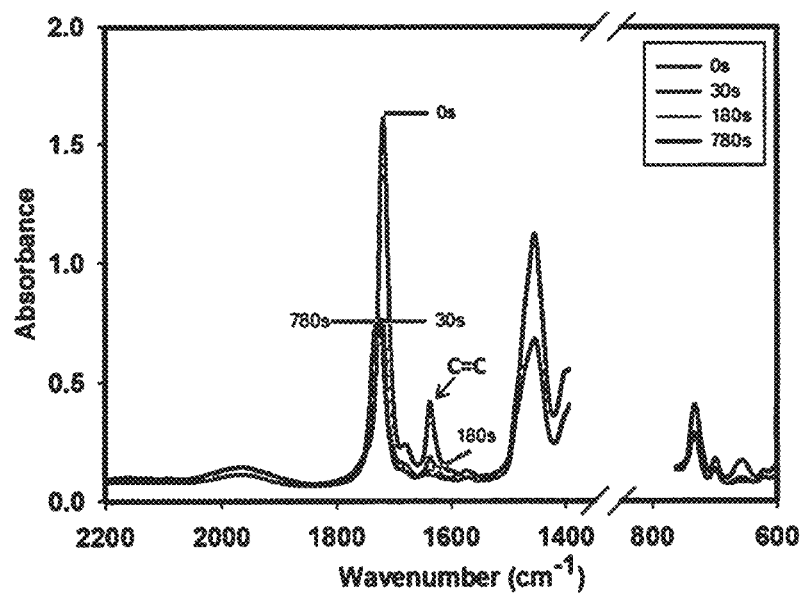
FIG. 5 provides a FT-IR spectra of formulation M-9-3.8 at four different UV exposure times.
Figure 6B:
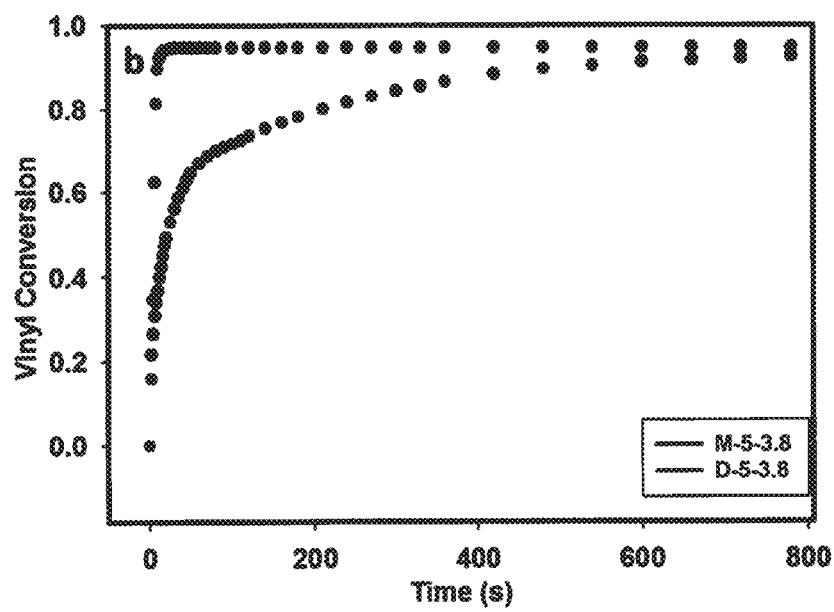
FIG. 6B provides a chart of the vinyl conversion as a function of UV exposure time for formulations M-5-3.8 and D-5-3.8.
Figure 7A:
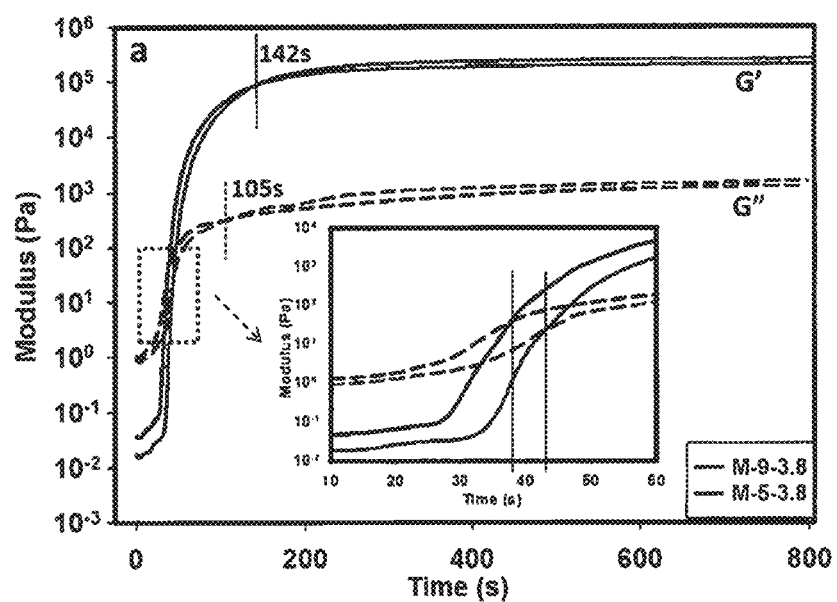
FIG. 7A provides a chart of the development of elastic (G') and viscous (G") modulus as a function of UV exposure time for formulations M-5-3.8 and M-9-3.8 (inset figure: magnification of gel point area).
Figure 7B:
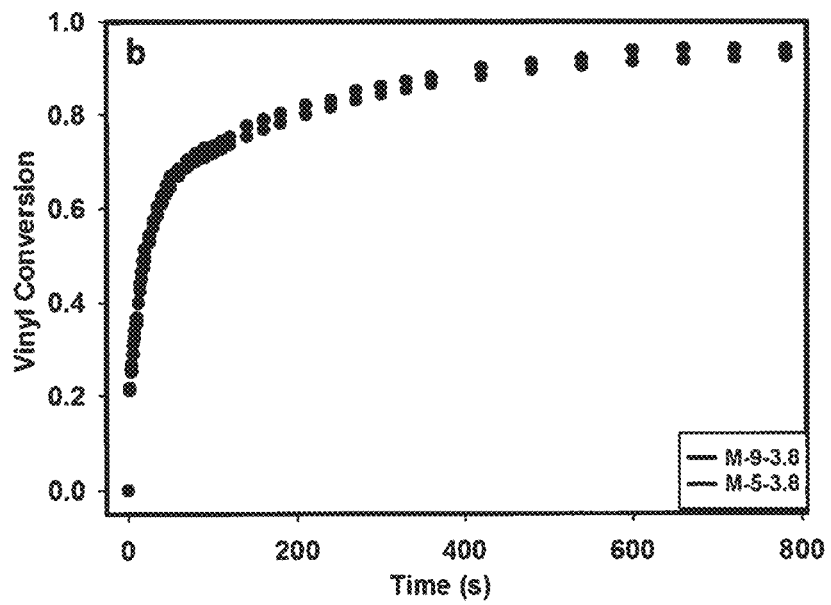
FIG. 7B provides a chart of the development of vinyl conversion as a function of UV exposure time for formulations M-5-3.8 and M-9-3.8.

The real time FT-IR technique was utilized to monitor the curing kinetics of all samples. The infrared spectra of formulation M-9-3.8 at four different UV exposure times are shown in FIG. 5 as a representative of all formulations. Previous to the UV exposure, the C=C absorption band of vinyl groups (~1636 cm$^{-1}$) was quite evident, whereas this band was notably diminished as the curing reaction proceeded. As the reaction approached completion, the C=C band almost dropped to the zero absorption at 780 s, implying that the vast majority of the C=C functional groups were reacted. The changes of the C=C band areas were used to calculate the vinyl conversions and plotted as a function of UV exposure time for each formulation (FIGS. 6B, 7B, and 8).

Figure 6A:
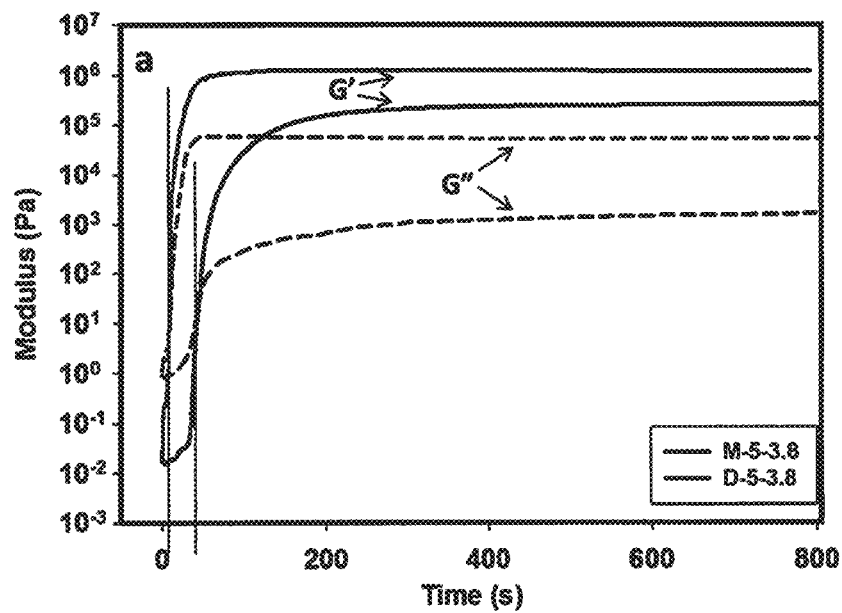
FIG. 6A provides a chart of the development of elastic and viscous modulus as a function of UV exposure time for formulations M-5-3.8 and D-5-3.8.

FIG. 6A shows the modulus development of time sweep for the UV-curable formulations M-5-3.8 and D-5-3.8 based on mono-functional or di-functional reactive diluents in order to study the functionality effects. Both the elastic and viscous modulus of di-functional formulation showed an instant increase after being exposed to the UV radiation, whereas mono-functional formulation exhibited a gradual increase in the elastic and viscous modulus. Moreover, the gel point shifted from 45 s to 8 s as the functionality of the reactive diluents was increased from one to two. This significant upshift of the reaction rate from mono-functional to di-functional reactive diluents could be explained by the fact that the reactive diluents with higher degree of functionalities showed faster responses to the UV radiation process. In a UV curing reaction, where the (meth)acrylated oligomers are polymerized, the average crosslinking equals to the average degree of polymerization of the vinyl double bonds. Consequently, a multilayer and star-shaped cross-linked structure is formed at the end of reaction. In contrast to the mono-functional reactive diluents, the addition of di-functional reactive diluents greatly increased the cross-link density, which gave rise to almost ten times larger values of the elastic and viscous modulus at the end of the UV curing process. This was demonstrated by the plateau values of G' and G'' curves for M-5-3.8 and D-5-3.8 formulations as shown in FIG. 6A.

The evolution of vinyl conversion for mono-functional and di-functional formulations M-5-3.8 and D-5-3.8 was obtained from FT-IR spectra (FIG. 6B), further confirming that the reactive diluents having more vinyl functionalities exhibited faster responses to the radiation process. At the initial stage of UV exposure, the vinyl conversion of di-functional formulation D-5-3.8 immediately increased to a stable value of ~0.95 within a few seconds (~18 s). However, the vinyl conversion curve of mono-functional formulation M-5-3.8 demonstrated a slow increase after being exposed to the UV radiation and reached the stable value of ~0.93 at a much longer time (~780 s). The lower ultimate conversion value of formulation M-5-3.8 compared to that of formulation D-5-3.8 could be ascribed to the chemical structures of the reactive diluents utilized. In fact, mono-functional (meth)acrylated monomers are considered as viscosity and crosslinking reducers owing to the depletion of active functionalities compared to those of di-functional monomers.

The ethylene oxide repeating units of the reactive diluents used in this study could also have an effect on the curing kinetics and properties of the resulting UV-curable formulations. In order to investigate the effects of PEG side chain length, two mono-functional reactive diluents MPEGMA having different repeating units of n=5 and 9 were utilized. Before UV radiation, both formulations M-5-3.8 and M-9-3.8 exhibited a Newtonian fluid behavior throughout the testing frequency range. Compared to formulation M-5-3.8, formulation M-9-3.8 showed a higher viscosity over the entire frequency range because of its higher molecular weight. The evolution of elastic and viscous modulus vs. UV exposure time for formulations M-5-3.8 and M-9-3.8 is shown in FIG. 7A. As shown, both samples showed a rapid increase in G' and G'' values after being exposed to the UV radiation. Compared to formulation M-5-3.8, formulation M-9-3.8 containing the reactive diluent having higher molecular weight consistently maintained its larger G' and G'' values till 142 s and 105 s, respectively. Then, the G' and G'' of formulation M-5-3.8 started to show higher values that those of formulation M-9-3.8, mainly due to the higher reaction rates as a result of the larger mobility of MPEGMA free radicals with shorter PEG chains.

As already mentioned, the viscosity of reactive diluent MPEGMA with longer PEG side chain (n=9) was considerably higher than that of the reactive diluent with shorter PEG side chain (n=5). This difference in viscosity could play a significant role on the rheological properties especially in the initial curing stages. In fact, a larger increase of elastic and viscous modulus could be observed for formulation M-9-3.8 at the initial curing. Additionally, an earlier gel point appeared accordingly as illustrated by the inset figure in FIG. 7A, indicating that formulation M-9-3.8 reached transition from a viscous liquid to a viscoelastic gel sooner than formulation M-5-3.8. It is believed that the stronger hydrogen bonding in formulation M-9-3.8 may result in the closer association of PEG/PPG chains, resulting in an earlier gelation compared to that of formulation M-5-3.8.

Beyond 142 s, the elastic (G') modulus curve of formulation M-5-3.8 almost overlapped with that of formulation M-9-3.8. This observation also happened for the viscous (G'') modulus curve after 105 s. In fact, this phenomenon revealed that the ultimate dynamic modulus was insignificantly influenced, if not completely unaffected, by the molecular weight of the mono-functional reactive diluents. It is believed that the PEG side chains of mono-functional reactive diluents only formed dangling ends in the crosslinked networks and did not contribute to the elastic modulus of these systems. As shown in FIG. 7B, the vinyl conversion vs. UV exposure time for both formulations M-5-3.8 and M-9-3.8 reached ~0.65 conversion within 50 s with almost identical conversion speed, which again proved the comparable mobility of both reactive diluents.

The UV curing process of all developed formulations in this study was based on the copolymerization between PPG-b-PEG-b-PPG dimethacrylate and the mono-functional or di-functional reactive diluents. By modifying the content of each component, the mechanical properties and curing kinetics of the resulting crosslinked polymer networks could also be greatly varied. To study the quantitative effects of reactive diluents, three different amounts of reactive diluents including 40 wt. %, 50 wt. %, and 60 wt. % were selected to perform a time sweep of dynamic rheological measurement under external UV radiation. For these systems, the molar ratios of MPEGMA reactive diluent to PPG-b-PEG-b-PPG dimethacrylate were 3.8 (formulation M-9-3.8), 5.7 (formulation M-9-5.7), and 8.6 (formulation M-9-8.6), respectively.

Figure 8A:
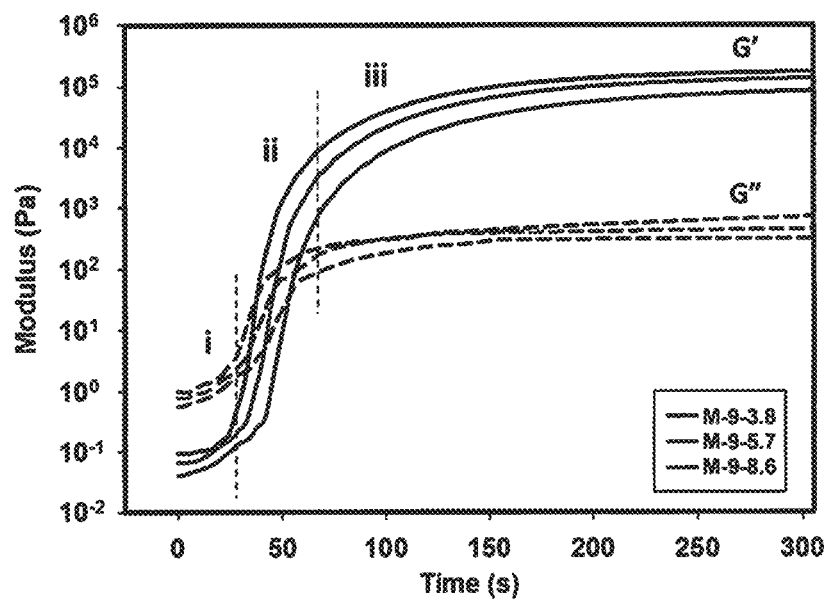
FIG. 8A provides a chart of the development of elastic (G') and viscous (G") modulus as a function of UV exposure time for formulations M-9-3.8, M-9-5.7, and M-9-8.6.

The evolution of elastic (G') and viscous (G") modulus as a function of UV exposure time for formulations M-9-3.8, M-9-5.7, and M-9-8.6 are shown in FIG. 8A. These formulations exhibited Newtonian fluid behavior duration the frequency range prior to the UV exposure. The complex viscosity of these systems decreased in the following order of M-9-8.6<M-9-5.7<M-9-3.8. Since the molecular weight of mono-functional reactive diluent used in these formulations was 500 g/mol, much less than that of PPG-b-PEG-b-PPG dimethacrylate (~2836 g/mol), its viscosity was much lower than that of the dimethacrylate oligomer. As a result, increasing the amount of reactive diluent decreased the overall viscosity of the mixtures.

As shown in FIG. 8A, both elastic (G') and viscous (G") modulus curves demonstrated a three regime development: a gradual increase in the beginning (regime i) followed by a rapid increase (regime ii), and eventually a gradual leveling off (regime iii). In a free radical polymerization, these regimes could approximately ascribed to the photo initiation, propagation, and termination steps, respectively. Furthermore, formulation M-9-8.6 with higher reactive diluent content showed lower modulus values (both G' and G") at a given UV exposure time. It has been already discussed that the addition of mono-functional reactive diluents decreased the crosslink density, while the addition of multi-functional reactive diluents resulted in the increased crosslinking. Thus, the more mono-functional reactive diluents added, the lower crosslink density could be obtained, leading to decreased modulus level. Besides, owing to the lower crosslink density in the presence of higher reactive diluent content, the gel point was postponed, as indicated by the delayed crossover of G' and G" curves at higher contents of mono-functional MPEGMA reactive diluent.

Figure 8B:
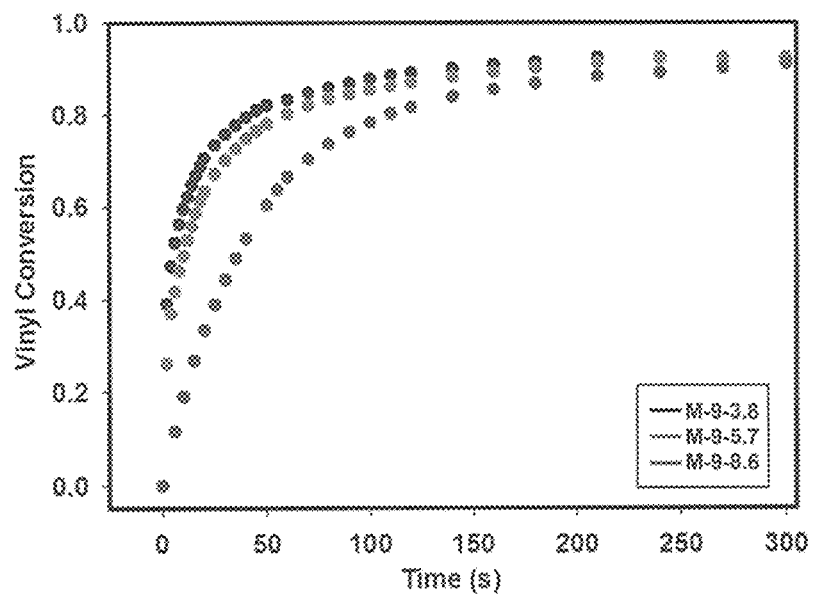
FIG. 8B provides a chart of the development of vinyl conversion as a function of UV exposure time for formulations M-9-3.8, M-9-5.7, and M-9-8.6.

FIG. 8B shows the development of vinyl conversion for formulations M-9-3.8, M-9-5.7, and M-9-8.6 after being exposed to the UV radiation. Each sample exhibited an instant increase in conversion and then quickly decreased and reached a stabilization level. As the reactive diluent content increased, the conversion decreased at a given time and the curve leveled off later, both of which are indicative of reduced reaction rate at the higher reactive diluent content. Since a lower degree of unsaturation has lower response to the radiation, formulation M-9-8.6 having more mono-functional reactive diluent was less sensitive to the radiation. Consequently, increase of vinyl conversion was slower in formulation M-9-8.6 compared to those of formulations M-9-3.8 and M-9-5.7.

Gelation Behavior

Figure 9:
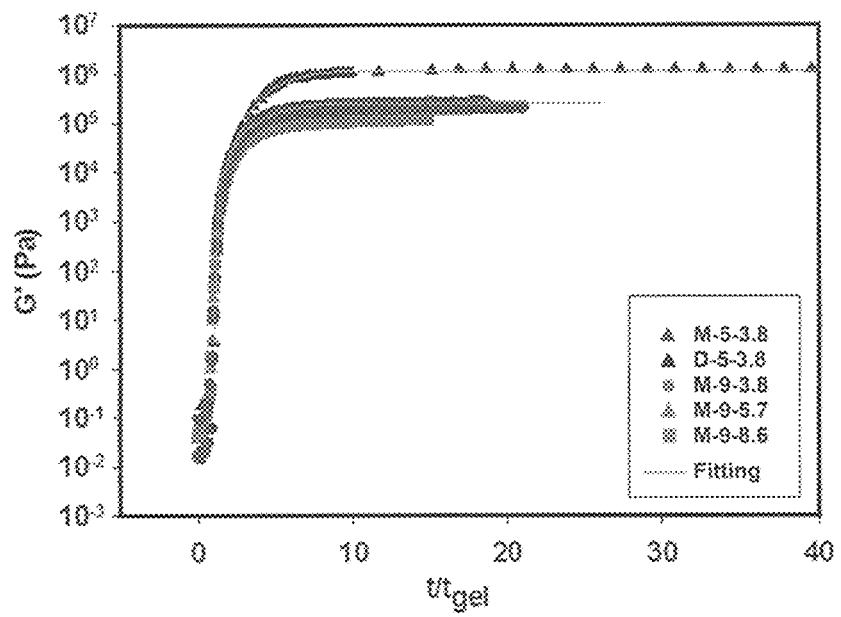
FIG. 9 provides a chart of the elastic modulus (G') curves for all formulations as a function of normalized time by the gel time ($t/t_{gel}$).

In order to further understand the gelation behavior of all UV curable formulations developed in this study, the elastic modulus G' for each formulation in a time sweep dynamic rheological measurement were plotted as a function of normalized time, namely dividing the time by the gel time ($t/t_{gel}$) (FIG. 9). Consequently, all G' curves collapsed into one master curve before falling off to a stable level. The overlap of all G' curves at the early stage after being scaled with the gel time revealed that the gelation processes showed a universal behavior independent of molecular weight, functionality, and content of the reactive diluents utilized in these systems. In general, a single dimensionless time is able to sufficiently describe the gelation mechanism for materials that are radically different in structure and properties.

A first order model, which was proposed by Cao et al. to describe the storage modulus (G') evolution during the gelation of colloidal suspensions, was introduced to fit the master curve of G' for all formulations. This model is given using Eq. 4:

$$G'=G'_\infty(1-\exp[-\alpha(^t/t_{gel}-1)^\beta])$$ (Eq. 4)

where $G'_\infty$ is the plateau modulus, t is time and $t_{gel}$ is the time at gel point, and $\alpha$ and $\beta$ are fitting parameters. As shown in FIG. 9, the main deviation from the master curve at the later stages was basically observed between the formulation D-5-3.8 having di-functional reactive diluent and all the other formulations containing mono-functional reactive diluents. Although all formulations with mono-functional reactive diluents could be fitted into one curve with fitting parameters of $\alpha=0.12$ and $\beta=1.54$, formulation D-5-3.8 based on di-functional PEGDMA reactive diluent displayed fitting parameters of $\alpha=0.02$ and $\beta=2.47$. The discrepancy of master curves between the formulations containing reactive diluents having different functionalities could be ascribed to different crosslinking densities. In fact, the polymer network formed by di-functional reactive diluent had a high crosslinking density, hence leading to a notable higher plateau modulus level compared to that of the polymer networks created by the mono-functional MPEGMA reactive diluents.

The fact that all G' curves collapsed into one master curve at the initial stage demonstrated that the gelation processes of these PEG-based UV curable systems consist of a series of identical steps. The numbers of the steps needed to attain gel states are independent of reactive diluents used. However, the height of this step is affected by the molecular weight, functionality, and content of reactive diluents. When the time is normalized by the gel time, the effect of step height is eliminated. Therefore, the gel properties, given G', as a function of normalized time are independent of reactive diluents.

CONCLUSIONS

The rheological properties of UV curable electrical contact stabilization materials were investigated by the real time small amplitude oscillatory rheology. It was found that Winter-Chambon criteria was applicable in the evolution of dynamic modulus for the materials studied. The gel point values were evaluated as the G'-G" crossover, validated by the complex viscosity vs. oscillation frequency curves as well as tan δ vs. UV exposure time at a series of oscillation frequencies. The real time FT-IR spectroscopy was successfully utilized to study the crosslinking kinetics of the UV curable materials. A combination of real time rheology and FT-IR spectroscopy was exploited to study the effect of reactive diluents. It was found that the use of di-functional reactive diluent or a decreased content of mono-functional reactive diluents both cause higher crosslinking density, hence higher modulus and accelerated reaction rate. The molecular weight of mono-functional reactive diluents barely affected the conversion rate or ultimate modulus due to the fact that they could only form the dangling ends in the crosslinked network. The gelation mechanism was proposed based on the fitting results of Cao et al. model into the master curves of elastic modulus evolution. According to these master curves, that the crosslinking process was composed of the same number of identical steps. which were independent of reactive diluents. However, the height of these step were affected by the molecular weight, functionality, and content of the reactive diluents.

Example Set 2

Materials and Synthesis

Poly(ethylene glycol)-block-poly(propylene glycol)-block-poly(ethylene glycol) (PEG-b-PPG-b-PEG) (Mn ~8,400 g/mol), methacryloyl chloride, triethylamine (TEA) and tetrahydrofuran (THF) were purchased from Sigma-Aldrich and used without further purification. NMR spectra were recorded with Varian Mercury 500 MHz instruments. Chemical shifts were reported with respect to residual solvent peaks as internal standard (CDCl$_3$, δ=7.24 ppm). Infrared spectra were collected on Thermo Scientific Nicolet iS50 FTIR spectrophotometer which was equipped with SMART iTX ATR. Gel permeation chromatography (GPC) measurements were performed by Waters instrument coupled with Bryce-type differential refractometer (RI) as a detector and TSK gel SuperMultipore PW-H (TOSOH) column. Polyethylene oxide (PEO) and polyethylene glycol (PEG) were used as standards for the calibration. 75 wt. % aqueous solution of sodium azide (NaN$_3$), potassium phosphate monobasic (KH$_2$PO$_4$), sodium phosphate dibasic dodecahydrate (Na$_2$HPO$_4$.12H$_2$O), and sodium sulfate (Na$_2$SO$_4$) was used as an eluent solvent. The flow rate was 0.5 ml/min and polymer samples were prepared by dissolving 1 mg in 1 mL of solvent.

PEG-b-PPG-b-PEG dimethacrylate was synthesized based on the previously reported procedures and described as follows. PEG-b-PPG-b-PEG (Mn~8,400 g/mol) (168 g, 0.020 mol) was transferred into a three-neck round bottom flask and dissolved in 100 mL anhydrous THF. Then, triethylamine (4.86 g, 0.048 mol) was added to the solution at 0° C. Methacryloyl chloride (5.00 g, 0.048 mol) was dissolved in 24 mL anhydrous THF and added dropwise to the PEG-b-PPG-b-PEG solution by dropping funnel under nitrogen atmosphere. Hereafter, the mixture was stirred for 24 h at room temperature to complete the reaction. Vacuum filtration later was used to separate the insoluble triethylamine hydrochloride salts from the resultant mixture. The filtrate was passed through the column filled with neutral alumina to remove the excess residue of triethylamine. Finally, solvent was evaporated and the purified polymer was dried further in a vacuum oven at room temperature for 24 h. The synthesis pathway for the preparation of PEG-b-PPG-b-PEG dimethacrylate is shown in Scheme 3.

$^1$H NMR (500 MHz, CDCl3, δ (ppm)): 6.00-5.50 (two set of m, —C=CH$_2$, vinyl bonds), 3.70-3.38 (m, —O—CH$_2$— and —O—CH<, PEG and PPG chains), 1.11 (s, —CH$_3$, PPG chains). IR (cm$^{-1}$): 2800-2900 (str, asym and sym —CH$_2$— and —CH$_3$ stretches), 1720 (wk, >C=O stretch), 1270-1460 (med, —CH$_2$— and —CH$_3$ bending), 1090 (str, —C—O— stretch).

Scheme 3. Synthesis of PEG-b-PPG-b-PEG dimethacrylate.

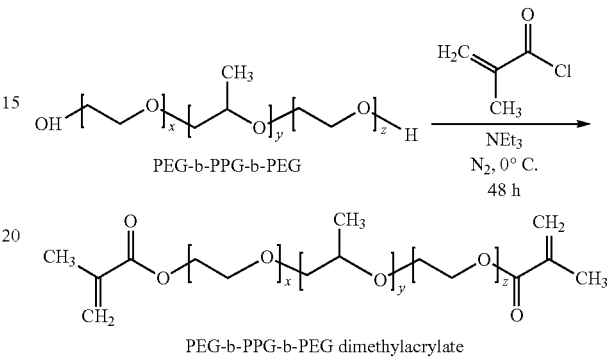

PEG-b-PPG-b-PEG dimethylacrylate

Sample Preparation

A chloroform solution of PEG-b-PPG-b-PEG dimethacrylate (PPPDI with the concentration ranging from 5 mg/mL to 20 mg/mL was used to prepare thin films on ITO glass substrate via spin-coating (spin rate of 1000 rpm for 60 s). Prior to spin-coating, all ITO glass substrates were cleaned with DI water, acetone and isopropyl successively, followed by UVO treatment for 30 min. The resulted thin PEG-b-PPG-b-PEG dimethacrylate films were placed in a vacuum chamber at 25° C. for 24 h for further residual solvent removal. ITO/PPPDI/Al junctions were fabricated by use of standard vacuum deposition techniques. The Al films (100 nm) were deposited from resistively heated sources onto the polymer coated ITO glass substrate in a stainless steel vacuum chamber with a base pressure 10$^{-6}$ Torr. 99.999% pure or better source materials were used for Al films deposition.

Variable-angle Spectroscopic Vis Ellipsometry

The thickness along with optical constants (n, k) of dry spin-coated PPPDI films were determined by variable-angle spectroscopic Vis ellipsometry (VASE, J. A. Woollam Co., M-2000) over a wavelength range of 300-1800 nm with fixed incident angle at 75°. The obtained ellipsometric angles (Δ, Ψ) were fitted by a general oscillator model, consisting of the ITO glass substrate (containing an ITO layer and the SiO$_2$ substrate), and a Cauchy model to describe the polymer film, using Complete EASE software. Each sample was measured at over 3 different locations to get an average of the film thickness.

2.4 I-V (J-E) Measurements

The current vs. voltage (I-V) characteristics of obtained ITO/PPPDI/Al junctions were measured using a Keithley 2400 source-power unit, with the data recorded by a commercially available data acquisition software package. The current density vs. electric field (J-E) data was then derived numerically from I-V measurements, by the aid of known film thickness and junction area (0.045 cm$^2$). Measurements at temperature below 298 K were performed in a cryostat filled by liquid nitrogen with the temperature measured by a Si tunnel diode (CY7 purchased from Omega Technologies Company). Measurements at 298 K were performed in a nitrogen-filled glove box (<0.1 ppm of $O_2$ and $H_2O$) to minimize the oxidation of aluminum.

RESULTS AND DISCUSSION

Materials Characterization

Figure 10A:
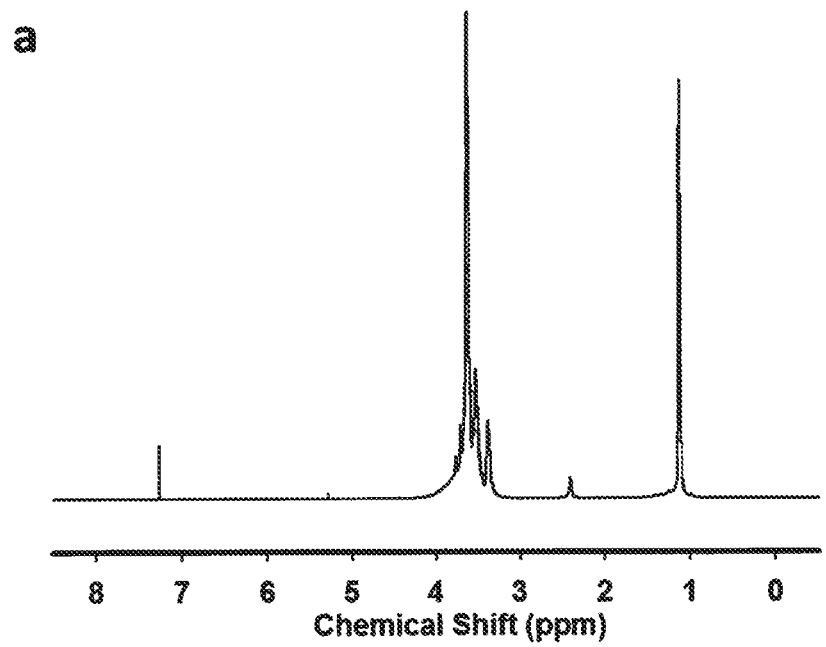
FIG. 10A provides an $^1$H NMR spectra of PEG-b-PPG-b-PEG.
Figure 10B:
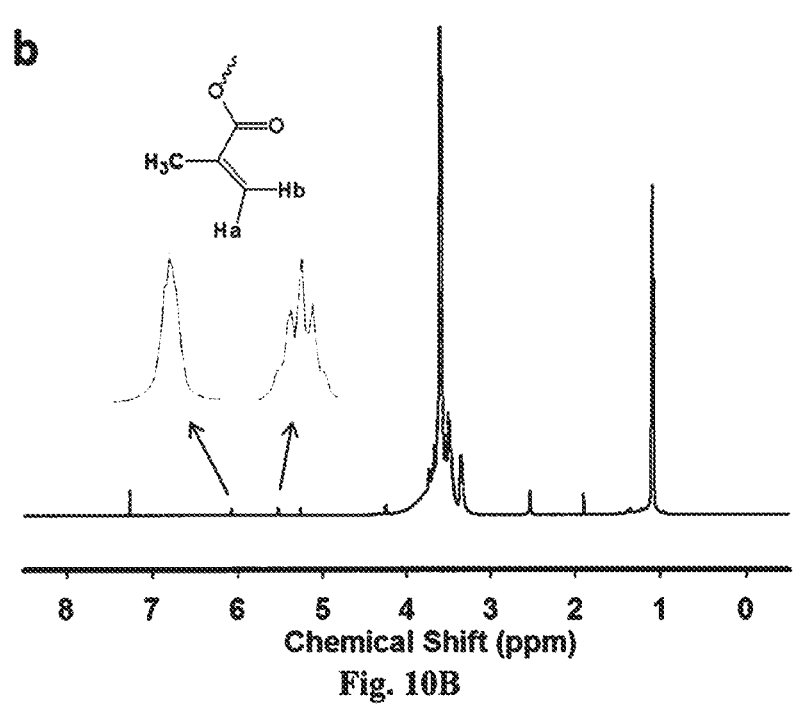
FIG. 10B provides an $^1$H NMR spectra of PPPDI.
Figure 11:
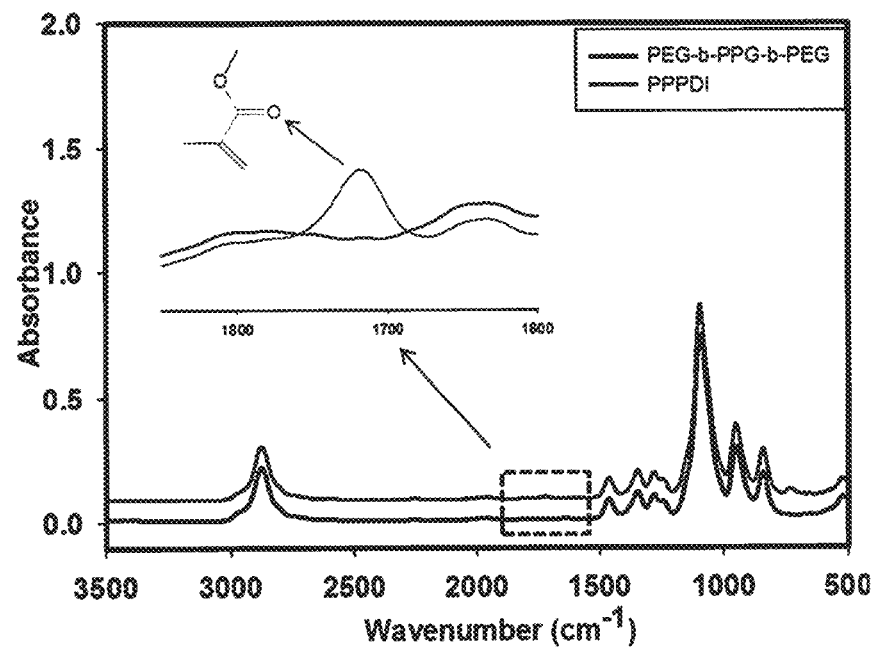
FIG. 11 provides a . IR spectroscopy of PEG-b-PPG-b-PEG (black curve) and PPPDI (red curve).

The synthesized PPPDI was characterized by Fourier transform infrared (FT-IR) spectroscopy and hydrogen nuclear magnetic resonance ($^1H$ NMR). A comparison of the $^1H$ NMR spectra between the starting and modified triblock copolymers, as shown in FIGS. 10A and B, indicates the presence of two vinylic hydrogen resonances ($H_a$ and $H_b$) at 5.50 and 6.00 ppm for the modified triblock copolymer, which confirms the presence of the methacrylate end groups. The FT-IR spectroscopy of these two systems is illustrated in FIG. 11. It was found that both samples exhibit similar pattern except the presence of a weak signal at 1720 $cm^{-1}$ for the modified polymer because of the carbonyl stretching mode. Since the amount of methacrylate groups compared to the aliphatic polymer chains was low, the appearance of weak absorption band due to the carbonyl groups was expected. In conclusion, the higher modified molecular weight PEG-b-PPG-b-PEG was synthesized accordingly and characterized by NMR and FT-IR.

Current-Voltage Characteristics

Figure 12:
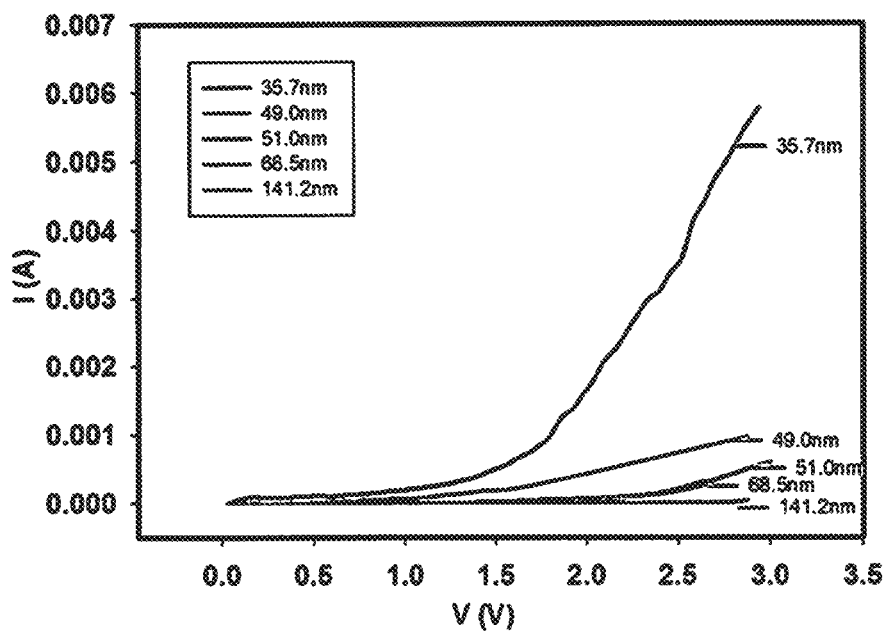
FIG. 12 provides a chart of the current-voltage characteristic of Al/PPPDI/ITO with film thickness ranging from 35.7 nm to 141.2 nm at 298 K.

The I-V characteristic for thin PPPDI films with thickness ranging from 35.7 nm to 141.2 nm measured via variable-angle spectroscopic Vis ellipsometry was measured under d.c. circuit at 298 K and shown in FIG. 12. It can be seen that at low voltage the current is linearly increasing with voltage, which is Ohmic behavior. As the voltage further increases, the current increases significantly faster and positively deviates from the initial linear portion, exhibiting non-Ohmic conductivity. The same characteristic can be observed for each thickness.

Figure 13:
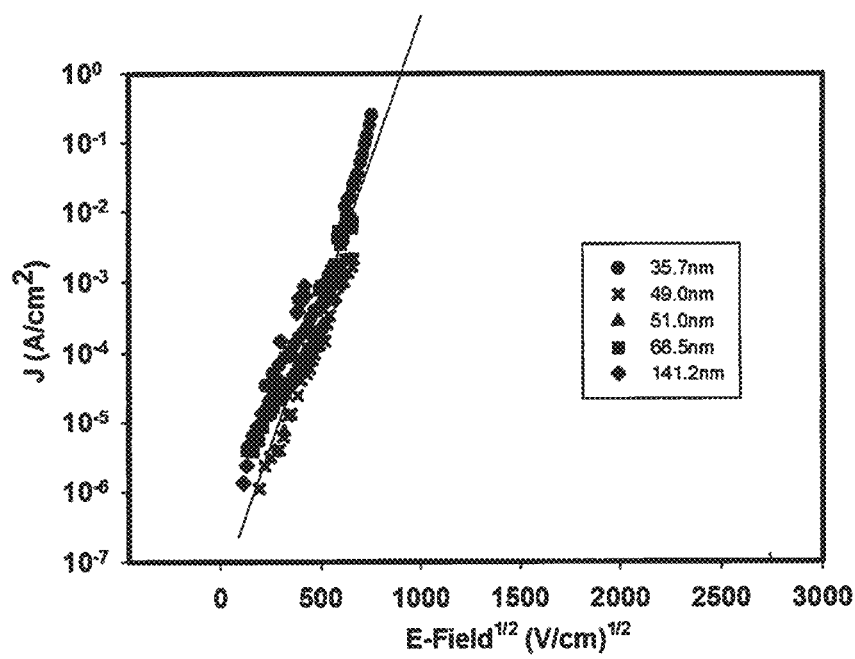
FIG. 13 provides a chart of the dependence of the current density on the electric field strength at 298 K for each film thickness.
Figure 14:
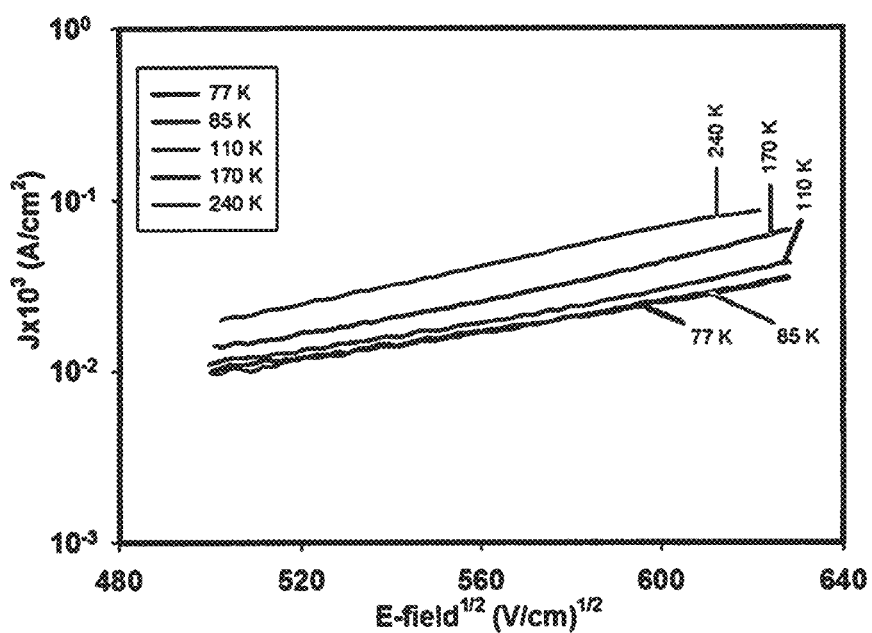
FIG. 14 provides a chart of the dependence of the current density on the electric field strength at different temperatures for the film thickness of 68.5 nm.

Furthermore, the logarithm of the current density increases almost linearly with the square root of the electric field (E-field) for the studied thickness range, as indicated in FIG. 13. Within experimental error, all the samples with different thickness values fall on the same curve (see red line in FIG. 13). Additionally, this linear relationship between the logarithm of the current density and the square root of E-field is valid for various temperature values between 77 K and 298 K at thickness 68.5 nm, as shown in FIG. 14. For other thickness values, this linear relation at various temperature values were also observed and provided in Supporting Information. From FIG. 14 it is clear that the current density passing through the sample increases as the measuring temperature increases at a given electrical field in the non-Ohmic conductivity region. Besides, the slope of the linear relationship between the current density and the square root of the electric field varies greater than 34% from 77 K to 240 K, which implies that the current density is a function of both electric field and temperature. Based on the linear dependence of the logarithm of current density on the square root of E-field as well as its high temperature dependence, Schottky emission, which results from the lowering of a Coulombic potential barrier by an applied electric field, is suggested here to describe the conductivity of PPPDI films in the studied thickness range. Accordingly, the higher current density at higher temperature is due to the enhancement of electron emission by higher thermal energy.

Thickness Effect

Figure 15:
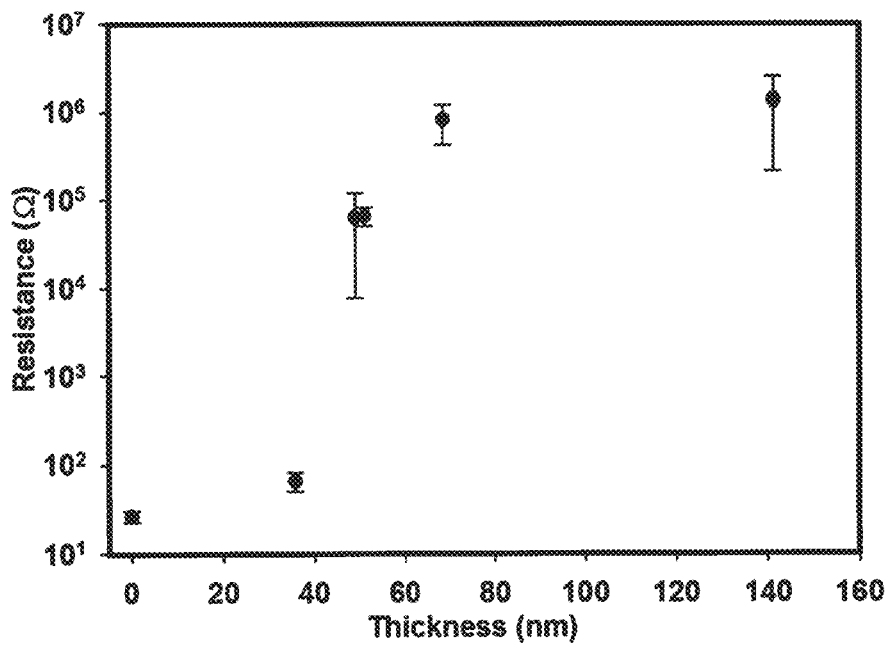
FIG. 15 provides a chart of the resistance of thin PPPDI films as a function of film thickness.

The resistance of thin PPPDI film at 298 K with given thickness was calculated as the slope of the initial linear portion (Ohmic region) of I-V characteristic, and plotted as a function of the thickness in FIG. 15. The electrical properties of PPPDI film are strongly dependent on the thickness. It can be found from FIG. 15 that at higher thickness level as 141.2 nm and 68.5 nm, the PPPDI film behaves as a typical insulator and possesses resistance value over $10^6 \Omega$. However, as the film becomes thinner, its resistance drastically decreases to around 60Ω due to the charge transfer in the sample at higher electric field. Tunneling conductivity is ruled out in this case since the tunneling theory anticipates the logarithm of the resistivity to be linearly dependent on the film thickness, given in Eq (5):

$$\sigma \propto \exp\left[(4\pi s/h)(2m\varphi)^{1/2}\right] \quad (5)$$

where σ is tunnel resistivity, s is thickness of film, h is Planck's constant, m is mass of electron and φ is work function, which does not agree with FIG. 15.

Figure 16:
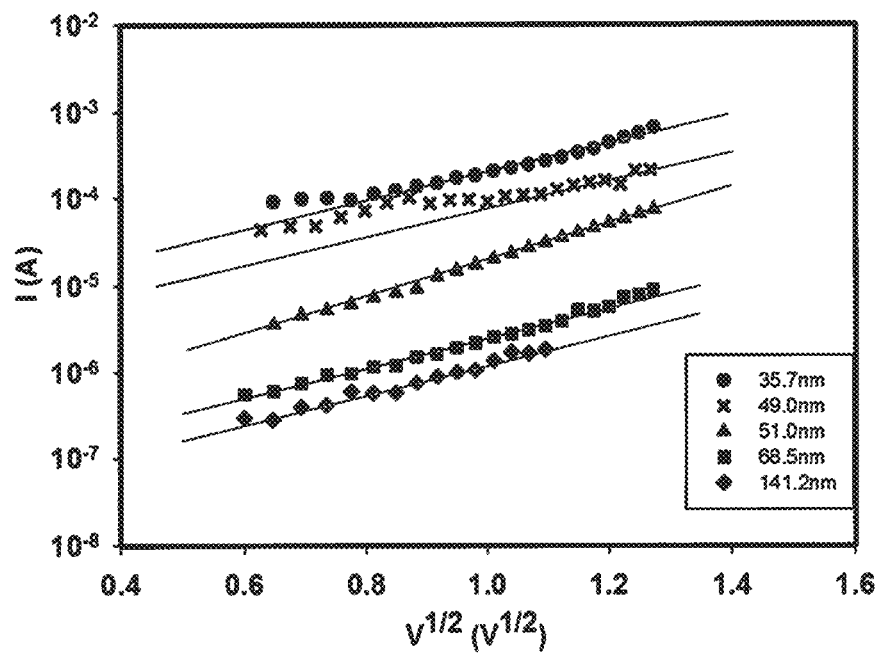
FIG. 16 provides a chart of the current vs. the square root of voltage for various film thickness values at 298 K.

On the other hand, the logarithm of the current increases linearly with the square root of the voltage in the non-Ohmic region for each thickness, as shown in FIG. 16. At given voltage, the current that goes through PPPDI film with higher thickness is smaller, indicating higher resistance. Moreover, the experimental data were fitted by straight lines (see red lines in FIG. 16) with the slopes varying by merely 15%, which illustrates that the slope of these lines barely depends on film thickness in the studied range. Hence, space-charge-limited (SCL) conductivity is not pertinent in this case either considering the SCL relationship between current and voltage given as:

$$I \propto \frac{V^2}{x^3} \quad (6)$$

where x is the film thickness, is not followed. In combination with FIG. 13, which reveals that the current density is only a function of electric field regardless of thickness in the 35.7-141.2 nm range, it is confident to propose that electrons emitted by applied high electric field attribute to the thin PPPDI film exhibiting significantly high conductivity (detailed discussion is provided in section 3.5). Similar phenomenon has been reported for other polymers elsewhere. For thin dielectric films, normally within nanometer scale, the distance of the electrodes is extremely close. Hence, the emitted electrons from electrode surfaces become dominant and form remarkable current.

Temperature Effect

Figure 17A:
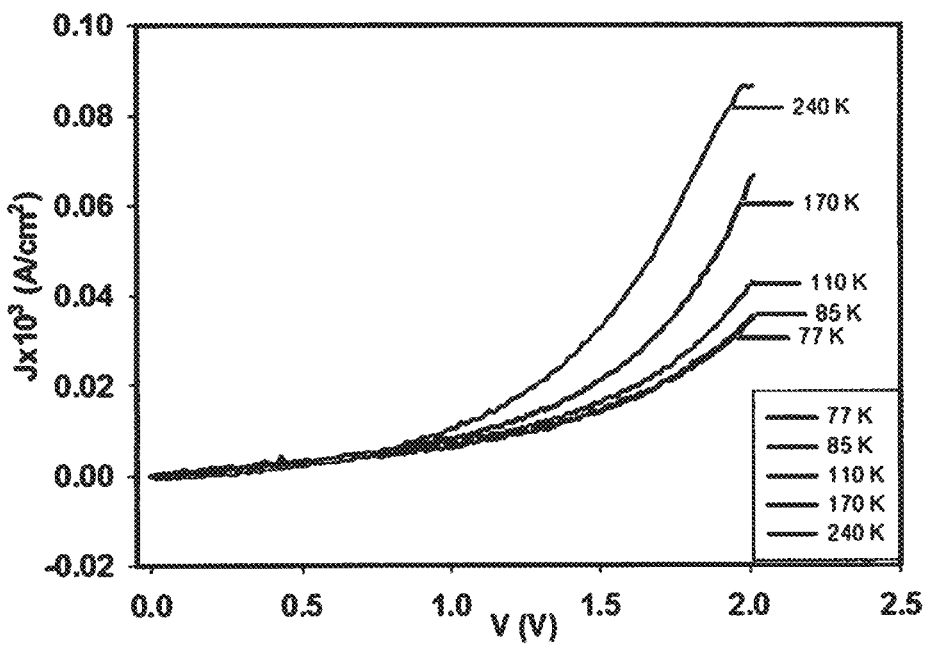
FIG. 17A provides a chart of the current density-voltage characteristic of Al/PPPI/ITO for film thickness of 68.5 nm at different temperatures.
Figure 17B:
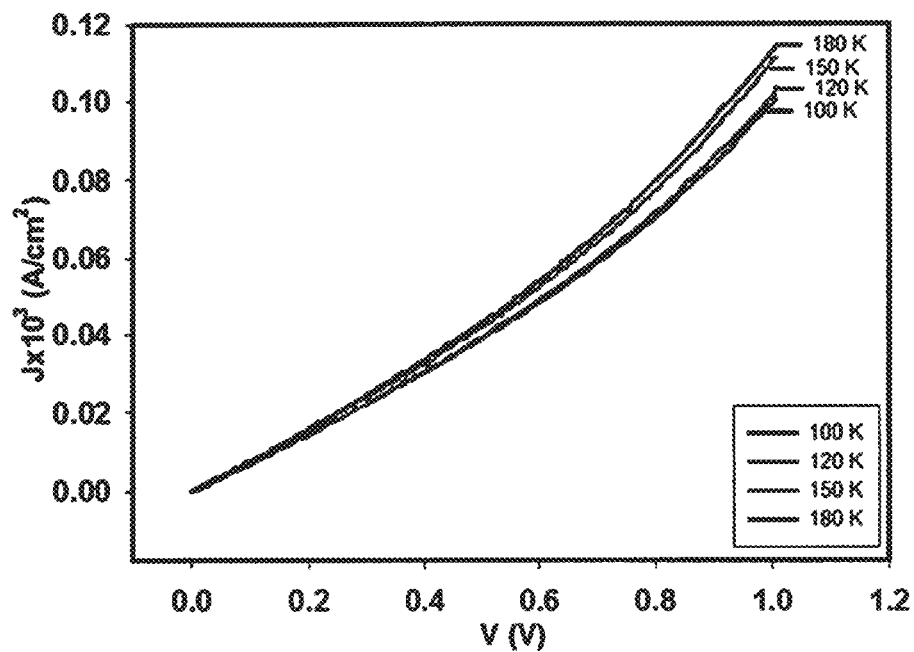
FIG. 17B provides a chart of the current density-voltage characteristic of Al/PPPI/ITO for film thickness of 49.0 nm at different temperatures.
Figure 17C:
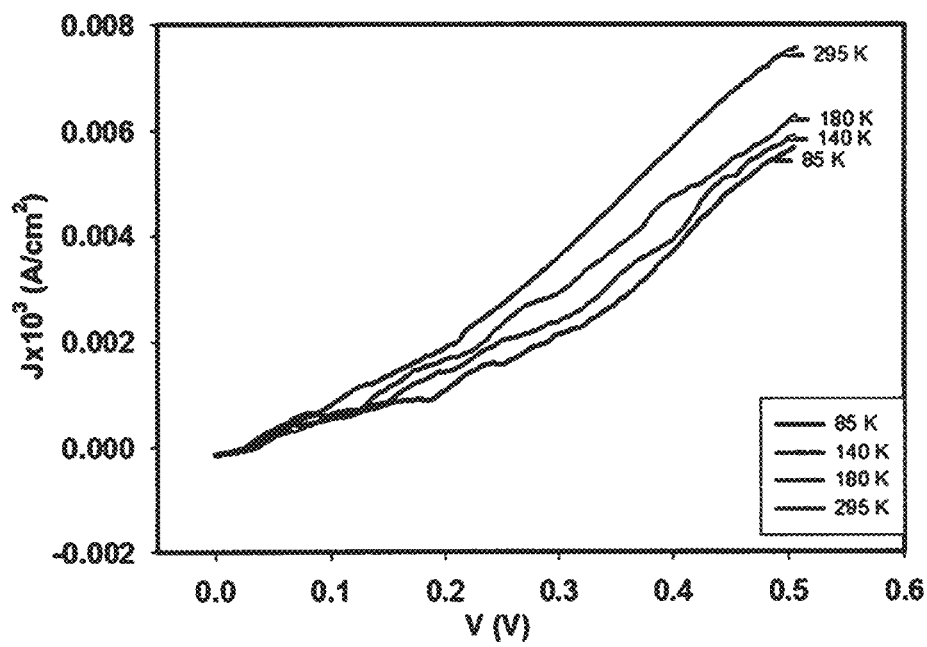
FIG. 17C provides a chart of the current density-voltage characteristic of Al/PPPI/ITO for film thickness of 35.7 nm at different temperatures.

The J-V characteristics of three selected PPPDI film thickness values (68.5, 49.0 and 35.7 nm) were measured at points between room temperature and liquid nitrogen temperature, illustrated in FIG. 17. In general, all three samples have exhibited similar J-V behavior: an initial linear region (Ohmic) followed by a positively deviated region (non-Ohmic), regardless of the environment temperature. Within the Ohmic region, the J-V curves are essentially overlapping for the studied measuring temperature, meaning that the current density weakly depends on the temperature at low external electric field. Nevertheless, the current density rises rapidly with the increase of temperature at higher voltage region, namely, the non-Ohmic region. This observation is also consistent with the previous discussion that the conductivity of thin PPPDI film is a function of both applied electric field and temperature. In the Ohmic region at low voltages the emitted electrons from electrodes are negligible, and thus the enhancement effect at higher temperature is also very minute. In the non-Ohmic region, on the contrary, the emitted electrons from electrodes become evident as a result of high applied electric field. Consequently, the higher current density detected from the sample is a reflection of the augmentation on the electron emission due to improved thermal energy at higher temperature.

Schottky Emission

According to the earlier discussion which has been concluded that thin PPPDI film exhibits non-Ohmic conductivity at higher voltages in the thickness ranging from 35.7 to 141.2 nm regardless of the measuring temperature, neither tunneling nor space-charge-limited conductivity is applicable in this case. It has been proposed that an emission mechanism, Schottky emission, should account for the current. Emission mechanism, consisting of the Poole-Frenkel and Schottky emission, arises from the lowering of a Coulombic potential barrier when exposed to an electric field. The former is manifest when the trap barrier in the bulk of the insulator material is lowered, whereas Schottky emission is prevailing in the case of attenuation of the metal-insulator barrier at the interface. Thus, the Poole-Frenkel conductivity is observed when the conduction is bulk-limited, and Schottky conductivity is established for electrode-limited system. For Schottky emission, the current density is expressed as:

$$J = AT^2 \exp\left[-\frac{q}{kT}\left(\phi - \frac{qE}{4\pi\varepsilon}\right)^{\frac{1}{2}}\right] \quad (7)$$

where J is current density, A is Richardson constant, T is temperature, q is electron charge, k is Boltzmann constant, $\phi$ is barrier height, E is electric field, and $\varepsilon$ is relative dielectric constant. The Poole-Frenkel equation is given as:

$$J = \sigma_0 E \exp\left\{\frac{q}{kT}\left[-\phi + \left(\frac{q}{\pi\varepsilon}\right)^{\frac{1}{2}} \cdot E^{\frac{1}{2}}\right]\right\} \quad (8)$$

where $\sigma_0 = eµn_0$ is the low field conductivity and all the other parameters are the same as equation (4).

Thus for constant temperature, both of these effects give the current density a dependence on the electric field (E) in form expressed as below:

$$\ln(J) = \beta E^{1/2} + C \quad (9)$$

with $\beta_S = \frac{1}{2}\beta_{PF}$, where $\beta_S$ is the parameter $\beta$ in Schottky equation and $\beta_{PF}$ is for Poole-Frenkel effect. Consequently, a linear relationship between the logarithm of the current density and the square root of the electric field strength should be observed for both emission mechanisms, and the rate of change in the current density with field strength, i.e., the slope of this linear relationship can be used to distinguish between these two types of conductivity.

As expected, all the samples demonstrate linear relationship between log (J) and $E^{1/2}$ regardless of film thickness, as illustrated in FIG. 13. Despite some scatter, all those lines fall on the same curve (see trend line in FIG. 13) within experimental error, indicating that the slope is not thickness dependent, and is only a function of field strength at constant temperature, which is also in agreement with the emission mechanism. The slope of experimental results, noted as $\beta_{exp}$, was calculated from the fitting straight line (red line in FIG. 13), and compared with the theoretically derived values of the Schottky ($\beta_S$) and Poole-Frenkel ($\beta_{PF}$) coefficients, as listed in Table 2. The dielectric constant of PPPDI used to derive $\beta_S$ and $\beta_{PF}$ is taken as 11.60 for estimation.

TABLE 2

List of β coefficients.

| Coefficient | Value (×10⁴) |
| --- | --- |
| $\beta_{exp}$ | 1.37 |
| $\beta_s$ | 1.86 |
| $\beta_{PF}$ | 3.73 |

Figure 18:
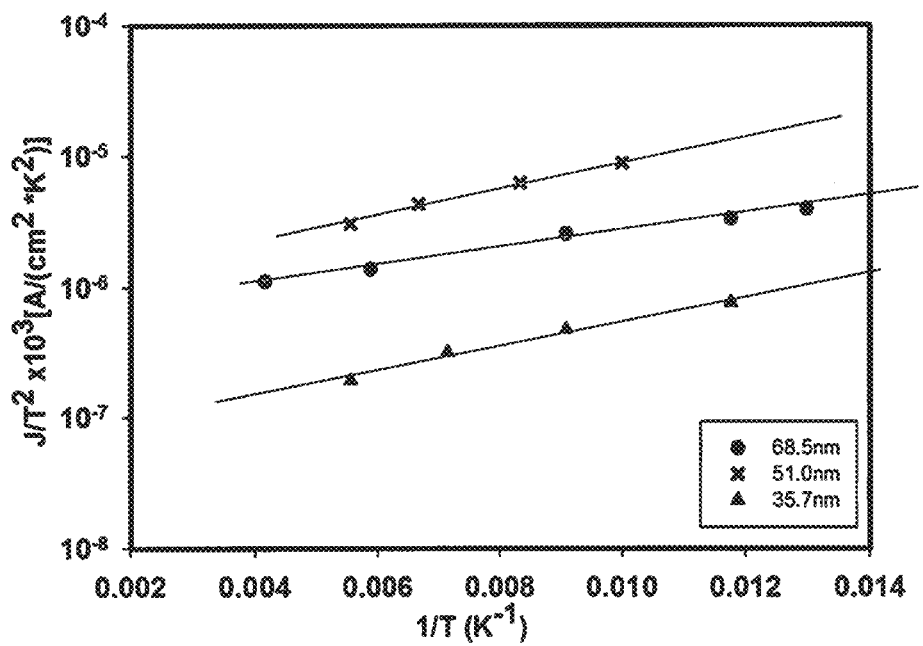
FIG. 18 provides a chart of the dependence of log($J/T^2$) on 1/T for different film thickness values.

A comparison of the values for the β coefficients leads to the Schottky conduction more likely applicable in thin PPPDI film. However, the consistency of the experimental and theoretical coefficients is not sufficient to verify the occurrence of either mechanism, since the value of dielectric constant ($\varepsilon$) used is suspect and the experimental error in I-V measurements might also alter the coefficient. Therefore, the dependence of current density on temperature is also demonstrated in order to confirm Schottky emission since rearranging Schottky equation (4) yields:

$$\ln\left(\frac{J}{T^2}\right) = K_0\left(\frac{1}{T}\right) \quad (10)$$

where $K_0$ is constant at given voltage. The current density at 2 V, 1 V and 0.5 V for film thickness of 68.5, 51.0 and 35.7 nm, respectively were selected to calculate $$\frac{J}{T^2}$$

and plotted as a function of $$\frac{1}{T}$$

in FIG. 18. It can be clearly seen that $$\log\left(\frac{J}{T^2}\right)$$

is linearly dependent on $$\frac{1}{T}$$

between 77 K and 298 K for each film thickness, which is more convincing that the Schottky emission contributes to the non-Ohmic conductivity of thin PPPDI films.

CONCLUSION

A block copolymer PEG-b-PPG-b-PEG dimethacrylate was synthesized to minimize the contact resistance between two co-operating metal contact surfaces, and hence improve the signal transmission in between. It was found that the resistance of this insulating polymer dramatically decreases to around 60Ω when the film thickness reaches 35.7 nm at 298 K, which greatly grants the usage of this material in metal contacts. Moreover, the high conductivity of ultrathin PPPDI film is ascribed to the electrons emitted by high applied electric field. A non-Ohmic conductivity behavior has been observed on thin PPPDI film in the thickness range between 35.7 and 141.2 nm regardless of measuring temperature. The study about the effects of the film thickness and measuring temperature on the current density-electric field characteristics has revealed that the logarithm of the current density is linearly dependent on the square root of electric field in the non-Ohmic region for each thickness and temperature. Also, this linearity is independent of the thickness value in the studied range. Additionally, this material exhibited higher conductivity at higher temperature, arising from the higher thermal energy of electrons. A comparison between the coefficient value of log(J) vs. $E^{1/2}$ from experimental results and theoretically derived values from Schottky and Poole-Frenkel emission indicated that the conductivity of PPPDI is more likely to be Schottky emission. The linear relationship between $$\log\left(\frac{J}{T^2}\right)$$

and 1/T runner confirmed the occurrence of Schottky emission in thin PPPDI films.

What is claimed is:

1. An electrical contact comprising:
   a first contact surface;
   a second contact surface; and
   a coating dispersed on at least one of the first or second contact surfaces, where the coating includes a cured product of a telechelic polypropylene glycol-polyethylene glycol multi-block "polymer,
   where the telechelic polypropylene glycol-polyethylene glycol multi-block polymer is selected from the group consisting of diacrylate polypropylene glycol-block-polyethylene glycols, dimethacrylate polypropylene glycol-block-polyethylene glycols, diacrylate polypropylene glycol-block-polyethylene glycol-block-polypropylene glycols, dimethacrylate polypropylene glycol-block-polyethylene glycol-block-polypropylene glycols, diacrylate polyethylene glycol-block-polypropylene glycol-block-polyethylene glycols, dimethacrylate polyethylene glycol-block-polypropylene glycol-block-polyethylene glycols, diacrylate polypropylene glycol-block-polyethylene glycol-block-polypropylene glycol-block-polyethylene glycols, dimethacrylate polypropylene glycol-block-polyethylene glycol-block-polypropylene glycol-block-polyethylene glycols, diacrylate polyethylene glycol-block-polypropylene glycol-block-polyethylene glycol-block-polypropylene glycols, dimethacrylate polyethylene glycol-block-polypropylene glycol-block-polyethylene glycol-block-polypropylene glycols, and combinations thereof.

2. The electrical contact of claim 1, where the telechelic polypropylene glycol-polyethylene glycol multi-block polymer is defined by the formula:

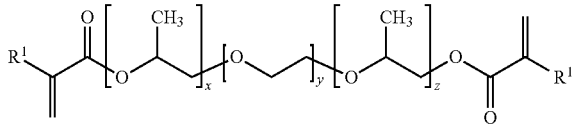

where each $R^1$ is a hydrogen or a methyl group, x is from about 5 to about 30 y is from about 5 to about 30, and z is from about 5 to about 30.

3. The electrical contact of claim 1, where the telechelic polypropylene glycol-polyethylene glycol multi-block polymer is defined by the formula:

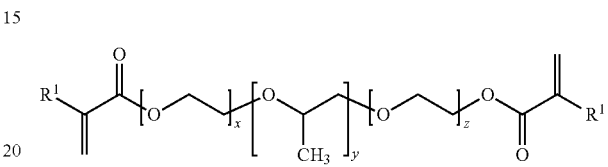

where each $R^1$ is a hydrogen or a methyl group, x is from about 5 to about 30 y is from about 5 to about 30, and z is from about 5 to about 30.

4. The electrical contact of claim 1, where the coating further includes a cured product of a reactive diluent.

5. The electrical contact of claim 4, where the reactive diluent is a telechelic polyethylene glycol oligomer or a mono-functional polyethylene glycol oligomer.

6. The electrical contact of claim 4, where the reactive diluent is a poly(ethylene glycol) diacrylate or poly(ethylene glycol) dimethacrylate defined by the following formula

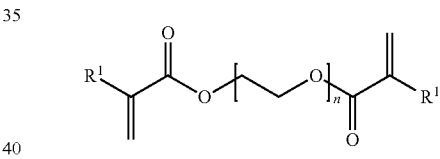

where each 10 is a hydrogen or a methyl group and n is from about 5 to about 9.

7. The electrical contact of claim 4, where the reactive diluent is a poly(ethylene glycol) methyl ether acrylate or poly(ethylene glycol) methyl ether methacrylate defined by the following formula

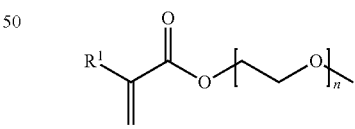

where $R^1$ is a hydrogen or a methyl group and n is from about 5 to about 9.

8. The electrical contact of claim 1, where the coating further includes a wetting agent.

9. The electrical contact of claim 1, where the coating further includes a photoinitiator.

10. The electrical contact of claim 1, where the coating is a gel.

11. The electrical contact of claim 1, where the telechelic polypropylene glycol-block-polyethylene glycol-block-polypropylene glycol polymer has a number average molecular weight of about 2500 to about 3000 g/mol.

12. The electrical contact of claim 1, where the coating has a thickness from about 1 nm to about 3000 nm.

13. The electrical contact of claim 1, where the coating is self-healing.

14. The electrical contact of claim 1, where the first contact surface and the second contact surface are each independently made from a metal selected from gold, silver, copper, and combinations thereof.

15. The electrical contact of claim 1, where the electrical contact is selected from electrical connectors, relays, switches, potentiometers, and faders.

16. A method of stabilizing an electrical contact comprising:
   providing an electrical contact that includes a first contact surface and second contact surface;
   coating at least one of the first or second contact surfaces with a curable coating composition that includes a telechelic polypropylene glycol-polyethylene glycol multi-block polymer, where the telechelic polypropylene glycol-polyethylene glycol multi-block polymer is selected from the group consisting of diacrylate polypropylene glycol-block-polyethylene glycols, dimethacrylate polypropylene glycol-block-polyethylene glycols, diacrylate polypropylene glycol-block-polyethylene glycol-block-polypropylene glycols, dimethacrylate polypropylene glycol-block-polyethylene glycol-block-polypropylene glycols, diacrylate polyethylene glycol-block-polypropylene glycol-block-polyethylene glycols, dimethacrylate polyethylene glycol-block-polypropylene glycol-block-polyethylene glycols, diacrylate polypropylene glycol-block-polyethylene glycol-block-polypropylene glycol-block-polyethylene glycols, dimethacrylate polypropylene glycol-block-polyethylene glycol-block-polypropylene glycol-block-polyethylene glycols, diacrylate polyethylene glycol-block-polypropylene glycol-block-polyethylene glycol-block-polypropylene glycols, dimethacrylate polyethylene glycol-block-polypropylene glycol-block-polyethylene glycol-block-polypropylene glycols, and combinations thereof; and
   curing the curable coating composition.

17. The method of claim 16, where the curable coating composition includes a photoiniator, and the step of curing the curable coating composition is performed by irradiating the curable coating composition with UV light.

18. The method of claim 16, where the curable coating composition further includes a reactive diluent.

* * * * *